US012024889B2

(12) United States Patent
Nill

(10) Patent No.: US 12,024,889 B2
(45) Date of Patent: Jul. 2, 2024

(54) ANCHOR PLATFORM ASSEMBLY WITH ANGLED BASEPLATE

(71) Applicant: LN1, Inc., Southampton, NY (US)

(72) Inventor: Lance Nill, Southampton, NY (US)

(73) Assignee: LN1, Inc., Southampton, NY (US)

( * ) Notice: Subject to any disclaimer, the term of this patent is extended or adjusted under 35 U.S.C. 154(b) by 0 days.

(21) Appl. No.: 17/900,988

(22) Filed: Sep. 1, 2022

(65) Prior Publication Data

US 2022/0412092 A1     Dec. 29, 2022

Related U.S. Application Data

(63) Continuation of application No. 17/266,372, filed as application No. PCT/US2019/046201 on Aug. 12, (Continued)

(51) Int. Cl.
*E04D 13/00*     (2006.01)
*F16B 9/02*     (2006.01)
*E04F 11/18*     (2006.01)

(52) U.S. Cl.
CPC ............... *E04D 13/00* (2013.01); *F16B 9/02* (2013.01); *E04F 11/1812* (2013.01); *E04F 11/1853* (2013.01)

(58) Field of Classification Search
CPC ...... F16B 37/122; F16B 37/125; F16B 9/026; E04D 13/00; E04F 11/1853; E04F 11/1812

(Continued)

(56) References Cited

U.S. PATENT DOCUMENTS 827,613 A * 7/1906 Brown ................... E04B 1/4107
52/707
2,227,713 A * 1/1941 Higgins .................... E04B 5/12
52/704

(Continued)

FOREIGN PATENT DOCUMENTS

KR    20 1999 0037090     10/1999

OTHER PUBLICATIONS

Korean Language Office Action dated Mar. 29, 2024.
(Continued)

*Primary Examiner* — Brian E Glessner
*Assistant Examiner* — Adam G Barlow
(74) *Attorney, Agent, or Firm* — Galgano IP Law PLLC; Thomas M. Galgano

(57) ABSTRACT

An anchor platform assembly for anchoring an object to a structure, especially intended for mounting the object on an inside or outside corner of a support structure mounted on a roof, includes an anchor baseplate having a first sidewall and second sidewall disposed at an angle to the first sidewall, each having a surface and second surface, an elongated post coupled to the first sidewall of the baseplate and projecting outwardly from the first surface thereof. The post has a first end secured to the first sidewall of the anchor baseplate, a second free end, and an at least partially threaded, cylindrical blind bore extending from the first surface of the first sidewall of the anchor baseplate into the post, with the second surface of the anchor baseplate being configured to allow the structure to lie generally flush against the second surface of the first sidewall except for the area of the second surface covered by the post. A cylindrical mechanical fastener having a straight thread is used for fastening an object to the anchor baseplate via the blind bore. A multiple post stud anchor platform assembly is also disclosed.

19 Claims, 21 Drawing Sheets

Related U.S. Application Data 2019, now Pat. No. 11,591,799, which is a continuation-in-part of application No. PCT/US2019/043264, filed on Jul. 24, 2019, which is a continuation-in-part of application No. PCT/US2019/018592, filed on Feb. 19, 2019, which is a continuation-in-part of application No. PCT/US2018/065465, filed on Dec. 13, 2018, which is a continuation of application No. 15/852,733, filed on Dec. 22, 2017, now Pat. No. 10,501,939.

(60) Provisional application No. 62/717,280, filed on Aug. 10, 2018.

(58) Field of Classification Search
USPC .............................. 52/169.8, 296, 709–711
See application file for complete search history.

(56) References Cited

U.S. PATENT DOCUMENTS

| | | | | |
|---|---|---|---|---|
| 3,284,973 A * | 11/1966 | Ames | ................. | E01C 23/01 |
| | | | | 52/155 |
| 3,323,765 A * | 6/1967 | Fernandez | .......... | E04H 12/2261 |
| | | | | 52/295 |
| 3,603,622 A * | 9/1971 | March | ................. | E04D 3/36 |
| | | | | 52/92.2 |
| 3,967,906 A * | 7/1976 | Strizki | .............. | E01F 9/635 |
| | | | | 403/2 |
| 4,363,467 A * | 12/1982 | Bos | .................... | E04F 11/181 |
| | | | | 52/704 |
| 4,581,863 A * | 4/1986 | Thaler | ............. | E04G 21/3276 |
| | | | | 52/126.2 |
| 4,614,070 A * | 9/1986 | Idland | ............. | E04H 12/2253 |
| | | | | 52/713 |
| 4,749,318 A * | 6/1988 | Bredal | .............. | F16B 37/122 |
| | | | | 411/180 |
| 5,375,384 A * | 12/1994 | Wolfson | ............. | E04B 1/0007 |
| | | | | 52/297 |
| 5,596,845 A * | 1/1997 | Strizki | .............. | E01F 9/635 |
| | | | | 52/707 |
| 5,603,187 A * | 2/1997 | Merrin | .............. | F24S 25/61 |
| | | | | 52/90.2 |
| 6,015,138 A * | 1/2000 | Kohlberger | ......... | E04H 12/2261 |
| | | | | 256/70 |
| 6,202,371 B1 * | 3/2001 | Natelli, Jr. | ......... | E04H 12/2292 |
| | | | | 52/832 |
| 6,213,701 B1 * | 4/2001 | Ukai | .................. | F16B 13/0833 |
| | | | | 411/340 |
| 6,336,620 B1 * | 1/2002 | Belli | ................. | E04F 11/1812 |
| | | | | 248/519 |
| 7,475,479 B1 * | 1/2009 | Ross | ................. | E04F 11/1812 |
| | | | | 29/525.01 |
| 8,424,255 B2 * | 4/2013 | Lenox | ................ | H01R 4/64 |
| | | | | 52/173.3 |
| 8,448,405 B2 * | 5/2013 | Schaefer | ............. | E04D 13/1407 |
| | | | | 52/60 |
| 8,453,416 B2 * | 6/2013 | Brindle | ............ | E04C 3/005 |
| | | | | 52/854 |
| 8,479,455 B2 * | 7/2013 | Schaefer | ................ | H02G 3/088 |
| | | | | 52/220.8 |
| 8,752,338 B2 * | 6/2014 | Schaefer | .................. | H01R 4/64 |
| | | | | 52/173.3 |
| 8,833,031 B2 * | 9/2014 | Steffen | ................... | F24S 25/61 |
| | | | | 52/173.3 |
| 8,959,857 B1 * | 2/2015 | Lin | .................... | E04H 12/2261 |
| | | | | 52/297 |
| 9,194,130 B1 * | 11/2015 | Stanley | ................. | E04B 1/58 |
| 9,712,106 B2 * | 7/2017 | Wentworth | ............ | F24S 25/33 |
| 9,976,298 B2 * | 5/2018 | Bergman | ................ | E04B 1/486 |
| 2010/0281791 A1 * | 11/2010 | Intagliata | ............ | E04H 12/2261 |
| | | | | 52/849 |
| 2012/0090263 A1 * | 4/2012 | Schaefer | ................ | H02G 3/088 |
| | | | | 220/3.9 |
| 2012/0144760 A1 * | 6/2012 | Schaefer | ............. | F16M 13/022 |
| | | | | 248/237 |
| 2013/0000243 A1 * | 1/2013 | Steffen | ................... | F24S 25/61 |
| | | | | 52/704 |
| 2013/0008102 A1 * | 1/2013 | Bindschedler | ........ | F24S 25/33 |
| | | | | 52/173.3 |
| 2013/0108392 A1 * | 5/2013 | Henriksen, Jr. | ...... | F16B 33/002 |
| | | | | 411/166 |
| 2013/0145704 A1 * | 6/2013 | Stein, Jr. | .................. | E06B 1/02 |
| | | | | 52/745.15 |
| 2013/0291479 A1 * | 11/2013 | Schaefer | ............... | F24S 25/70 |
| | | | | 52/745.21 |
| 2013/0292531 A1 * | 11/2013 | Schaefer | ............... | F16M 13/022 |
| | | | | 248/237 |
| 2014/0007532 A1 * | 1/2014 | Schaefer | ............. | E04D 13/1407 |
| | | | | 52/302.6 |
| 2014/0008506 A1 * | 1/2014 | Schaefer | ................. | E04B 1/388 |
| | | | | 248/237 |
| 2014/0174554 A1 * | 6/2014 | Meyberg | .................. | F16K 1/48 |
| | | | | 137/315.27 |
| 2014/0208664 A1 * | 7/2014 | Schaefer | .................. | E04C 3/06 |
| | | | | 52/705 |
| 2014/0208680 A1 * | 7/2014 | Schaefer | ................ | F16B 9/056 |
| | | | | 248/237 |
| 2014/0252292 A1 * | 9/2014 | Clarke | ............... | E04H 17/1413 |
| | | | | 256/65.14 |
| 2015/0184406 A1 * | 7/2015 | Naylor | ............... | E04G 23/0207 |
| | | | | 52/741.11 |
| 2015/0218824 A1 * | 8/2015 | Schaefer | ................ | F24S 25/20 |
| | | | | 52/704 |
| 2016/0145873 A1 * | 5/2016 | Green | ................ | E04F 11/1814 |
| | | | | 52/832 |
| 2016/0344334 A1 | 11/2016 | Danning | | |
| 2017/0175384 A1 * | 6/2017 | Bergman | ................ | E04B 1/486 |

OTHER PUBLICATIONS

Google Translation of Korean Office Action mailed Mar. 29, 2024 from KIPO.
Google translation of Korean Patent Reference 20-199-0037090.

\* cited by examiner

ANCHOR PLATFORM ASSEMBLY WITH ANGLED BASEPLATE

RELATED APPLICATIONS

This application is a continuation of U.S. application Ser. No. 17/266,372 filed Feb. 5, 2021 which dawns the benefit of U.S. Provisional Patent Application Ser. No. 62/717,280, filed Aug. 10, 2018; and is a 371 of PCT/US2019/04621 filed Aug. 12, 2019 which, in turn, is a continuation-in-part of U.S. PCT Application No. PCT/US2019/43264, filed Jul. 24, 2019, which, in turn, is a continuation-in-part of U.S. PCT Application No. PCT/US2019/018592, filed Feb. 19, 2019, which, in turn, is a continuation-in-part of U.S. Non-Provisional Patent Application Serial No. PCT/US2018/065465 filed Dec. 13, 2018 which is a continuation of U.S. Non-Provisional patent application Ser. No. 15/852,733, filed Dec. 22, 2017 (now U.S. Pat. No. 10,501,939), each of which is incorporated herein by reference thereto.

BACKGROUND OF THE INVENTION

Field of the Invention

An anchor platform assembly for anchoring and mounting an object to a support structure especially useful in the building trade for anchoring and mounting roof accessory structure on roofs, balconies and the like, such as, roofs and other raised, flat and pitched structures, terraces, balconies and the like, such as, e.g., railings, solar panels and lightning rods, while providing both strength and watertight performance, and which is especially configured for inside and outside corners, pitched roofs and other angled support surfaces.

Brief Description of the Prior Art

Various methods for mounting and waterproofing roof equipment, accessory structures or the like, which are attached to sloped or flat roofs, building terraces, roof decks, etc. are well known. In the roofing industry, there are many problems with water infiltration at equipment attachment points, particularly when flashing is not incorporated and/or sealants are solely relied on. A variety of sheathing methods and combinations thereof are used as water and moisture barrier on such structures such as asphalt roof tiles, poured or sheeted plastic or rubber membranes and the like. Currently, more and more roof heavy roof structures are being mounted on roofs such as, e.g., solar panels, satellite dishes, HVAC etc.

Especially for roof decks, balconies, terraces and the like, glass walls and/or railings are being mounted to avoid viewing obstructions such as would normally be the case with a wooden, cable or metal fence. These generally heavy structures must also be anchored to the roof structures. However, because of the loads they generate and the manner in which they are mounted, typically with anchors bolted through the roof, they create a "conduit" for water to penetrate through the roof, notwithstanding the fact that adhesives or glue are often used to seal the conduit in an attempt to prevent such water penetration.

In fact, over time, these heavy structures as a result of normal repetitive roof movement or shifting caused by, e.g., settling, temperature changes, and/or high winds, cause cracks in the adhesive or glues employed and cause eventual roof leaks. As a result, it is difficult for many of the installers to provide guarantees or obtain insurance against water or moisture damage caused by such conventional anchoring systems. Furthermore, such conventional methods and systems are not designed to adequately deal with mounting objects on inside and outside corners of the support structure.

The present invention seeks to overcome this problem by providing a novel anchoring system which avoids such problems in an advantageous and effective manner.

Accordingly, it is an object of the present invention to provide a novel anchor platform assembly usable for a wide variety of applications, especially for anchoring equipment and/or roof accessory structures to roofs and the like which can accommodate heavy loads and provide waterproof protection at the equipment attachment points and which addresses the problems of mounting such objects on angled support structures, such as inside and outside corners of the support structure.

It is a further object of the present invention to provide such a novel anchor platform assembly which is relatively simple in design and construction, easy to install and is relatively inexpensive to make.

It is a further object of the present invention to provide such a novel anchor platform assembly which can be used for a variety of roof or raised structures, including both flat roofs and pitched roofs, as well as roof decks, outdoor balconies, terraces and the like.

It is a more particular object of the invention to provide such a novel anchor platform assembly which is more reliable than prior art systems in providing a waterproof connection at the equipment attachment points.

It is yet a further object of the present invention to provide such a novel anchor platform which is universally adaptable for anchoring and mounting a multitude and wide variety of roof accessory structures including, inter alia, lightning rods, antennas, solar panels, satellite dishes, safety rails, glass railings, HVAC heating and air conditioning equipment, decorative sculptures, holiday ornaments, and the like, etc., while at the same time providing a watertight connection.

SUMMARY OF THE INVENTION

Certain of the foregoing and related objects are achieved according to the present invention by the provision of an anchor platform assembly for anchoring an object to a structure, comprising an anchor baseplate including a first sidewall and a second sidewall disposed at an angle to each other, with each of said sidewalls having a first surface and second surface on opposite sides thereof and a pair of opposite ends and wherein one of said ends of said first and second sidewalls are joined together. An elongated post is coupled to said anchor baseplate first sidewall and projects outwardly from said second surface thereof, with said post having a first end secured to said first sidewall of said anchor baseplate and a second free end, and an at least partially threaded, cylindrical internal blind bore extending from said first surface of said anchor baseplate first sidewall into said post, with said second surface of said first sidewall of said anchor baseplate being configured to allow the structure to lie generally flush against said second surface of said first sidewall, except for the area of said second surface covered by said post.

In a preferred embodiment, the anchor platform assembly additionally includes means for fastening an object to said anchor baseplate via said blind bore. The anchor baseplate first and second sidewalls are preferably generally rectangular. Preferably, said means for fastening an object comprises a cylindrical mechanical fastener having a straight thread. Desirably, the assembly additionally includes means for fastening said anchor baseplate to a structure. Advantageously, said anchor baseplate is generally L-shaped with said first sidewall disposed generally perpendicularly relative to said second sidewall thereof. Preferably, said blind bore is generally centrally-disposed in said first sidewall of said anchor baseplate, and said anchor baseplate first sidewall has a plurality of spaced-apart, ancillary through holes spaced from said blind bore. Desirably, the assembly additionally includes a plurality of mechanical fasteners, each receivable through one of said ancillary holes for fastening said anchor baseplate to the structure. Most advantageously, said means for fastening the object to said anchor baseplate comprises a bolt with an enlarged head and a threaded cylindrical shaft having a straight thread.

In a particularly preferred embodiment of the invention, said anchor baseplate post is cylindrical, and has either a smooth or at least partially externally-threaded outer surface. With the latter option, the assembly includes a nut receivable on said externally-threaded post for securing said anchor platform assembly to the structure from below. Most desirably, said anchor baseplate and post are made from metal and said first and second sidewalls are generally rectangular.

In another preferred embodiment of the present invention, the anchor baseplate first sidewall has a non-threaded throughbore, which partially defines said blind bore and which merges with said blind bore extending into said post. The post has a reduced diameter neck portion adjacent its top end which is configured and dimensioned for receipt within the non-threaded bore of said first sidewall.

Preferably, the anchor platform assembly also includes an object support member having a basewall and a bore formed therethrough which is positionable on said anchor baseplate so that the base wall bore is aligned with said threaded blind bore to permit said threaded cylindrical shaft of said bolt to be inserted through said basewall bore and into said threaded blind bore so as to fastened said object support member to said anchor baseplate. Advantageously, the assembly further includes an elongated and U-shaped support member for an object which has a generally planar basewall, and a pair of upstanding spaced-apart sidewalls each joined to an opposite end of said basewall thereof which, together with said basewall, defines a generally U-shaped channel with an open end in which an object may be inserted. Most advantageously, the object support member includes a pair of sidewalls each joined to an opposite end of said basewall thereof and each having a throughbore extending therethrough, and a support stand comprising a planar base and an upstanding tubular body member joined to said planar base, with said planar base having a throughbore formed therethrough alignable with said threaded blind bore of said anchor baseplate to permit said threaded bolt to be inserted through said base throughbore in to said threaded blind bore so as to fasten said planar base of said support stand to said anchor baseplate. The tubular body member also has opposing sidewalls, each having a throughbore aligned with the throughbore in the opposing sidewall, and means are provided for mechanically fastening said object support member to said support stand via at least one of said sidewall throughbores of said support stand and at least one of said sidewall throughbores of said object support member. As a result, the support stand can be mechanically fastened to said anchor baseplate via said throughbore of said base wall thereof and said blind bore of said anchor baseplate via said bolt.

In another particularly preferred embodiment of the present invention, the anchor baseplate first sidewall and second sidewall are arranged and secured together to form a generally V-shaped profile to permit the same to be mounted on a pitched structure. Especially when used for inside and outside corners, said anchor assembly comprises a plurality of said posts and blind bores; for example, two posts, and two blind bores. The assembly may include one or more elongated posts each comprising a threaded stud secured to said second surface of said first sidewall thereof of said anchor baseplate. Moreover, said means for fastening said anchor to a structure include one or more threaded studs. For example, if used in combination with a single post, a pair of threaded studs could be arranged in a spaced apart manner on opposite sides of said post on said first sidewall of said anchor baseplate, each stud having one end affixed to the second surface of said first sidewall and an opposite free end projecting outwardly therefrom.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

FIG. 11b is a top plan view, in part section, of the novel anchor baseplate assembly shown in FIG. 11a;

FIG. 11c is a front elevational view, in part section, of the novel anchor baseplate assembly shown in FIG. 11a;

FIG. 12b is a top plan view, in part section, of the novel anchor baseplate assembly shown in FIG. 12a;

FIG. 12c is a front elevational view, in part section, of the novel anchor baseplate assembly shown in FIG. 12a;

FIG. 13b is a top plan view, in part section, of the novel anchor baseplate assembly shown in FIG. 13a;

FIG. 13c is a front elevational view, in part section, of the novel anchor baseplate assembly shown in FIG. 13a;

FIG. 16b is a top plan view, in part section, of the novel anchor baseplate assembly shown in FIG. 16a;

FIG. 16c is a front elevational view of the novel anchor baseplate assembly shown in FIG. 16a;

FIG. 17b is a top plan view, in part section, of the novel anchor baseplate assembly shown in FIG. 17a;

FIG. 17c is a front elevational view, in part section, of the novel anchor baseplate assembly shown in FIG. 17a;

FIG. 18b is a top plan view, in part section, of the novel anchor baseplate assembly shown in FIG. 18a; and FIG. 18c is a front elevational view, in part section, of the novel anchor baseplate assembly shown in FIG. 18a.

DETAILED DESCRIPTION OF THE PREFERRED EMBODIMENTS

Figure 1:
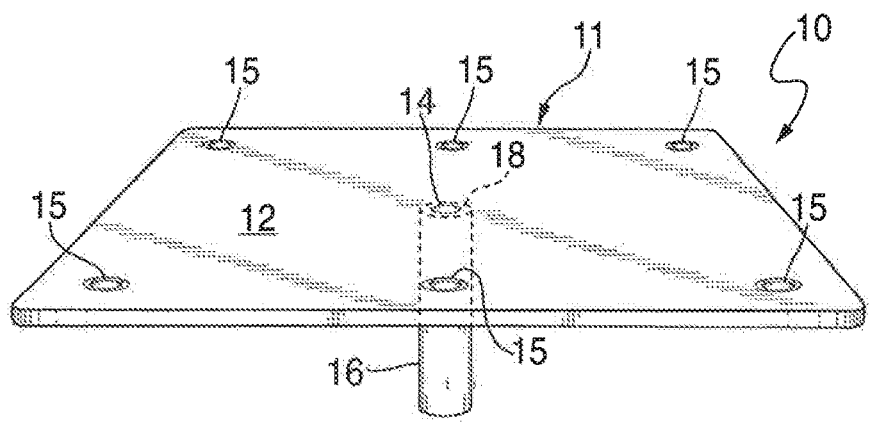
FIG. 1 is a top and side perspective view of a first embodiment of an anchor baseplate utilized in an anchor platform assembly embodying the present invention.
Figure 2:
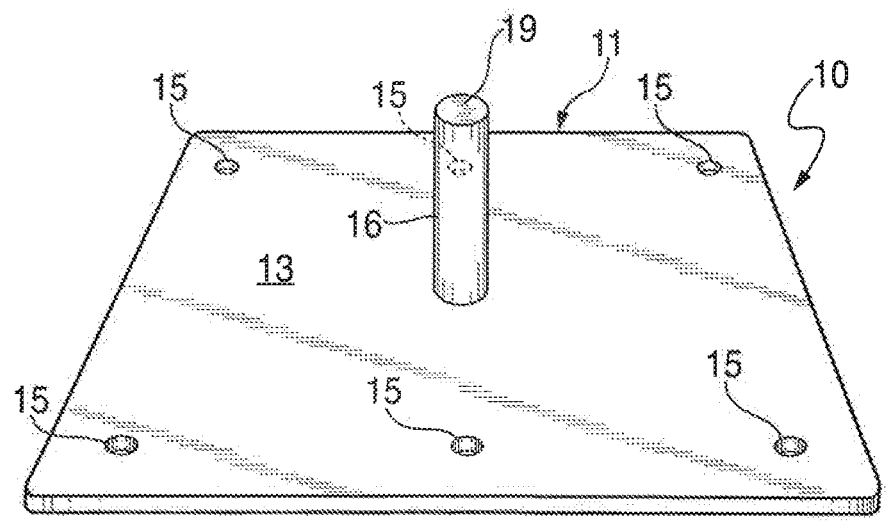
FIG. 2 is a bottom and side perspective view of the anchor baseplate shown in FIG. 1.

Turning now in detail to the drawings and, in particular, to FIGS. 1-7b thereof, therein illustrated is a novel anchor platform assembly embodying the present invention, as more particularly described and shown in Applicant's aforementioned U.S. patent application Ser. No. 15/852,733 and Application No. PCT/US2019/018592 for anchoring objects to a support structure, especially intended for a wide variety of anchoring applications which are universally adaptable to many different fields of use.

FIGS. 1-4c thereof illustrates a first embodiment of the present invention which comprises a novel anchor platform assembly, generally designed by reference numeral 10, especially designed for anchoring roof accessory structures to roofs and other raised, flat and/or pitched structures, such as terraces, balconies, stairs and the like. The main component of the anchor platform assembly is the anchor baseplate, generally designated by reference numeral 11, which preferably is made of stainless steel (but could be made of other metals, such as aluminum, bronze, etc.), and is preferably square or rectangular shaped and has a top surface 12 and a bottom surface 13. The anchor baseplate 11 has an internally-threaded central through bore 14 and six spaced apart peripheral through bores 15 positioned radially outward from the center bore 14 and generally adjacent to the periphery of the baseplate 11. In this embodiment, the anchor baseplate 11 also includes a preferably cylindrical rod or post 16 having an axially-extending, internally-threaded bore 17 (see FIG. 4b) having a top open end 18 and a closed bottom 19 (FIG. 2) which is secured preferably via welding to the anchor baseplate 11 so that the top open end 18 of its bore 17 abuts and is in registry with the bottom open end of center through bore 14 (see FIG. 4b).

Figure 3:
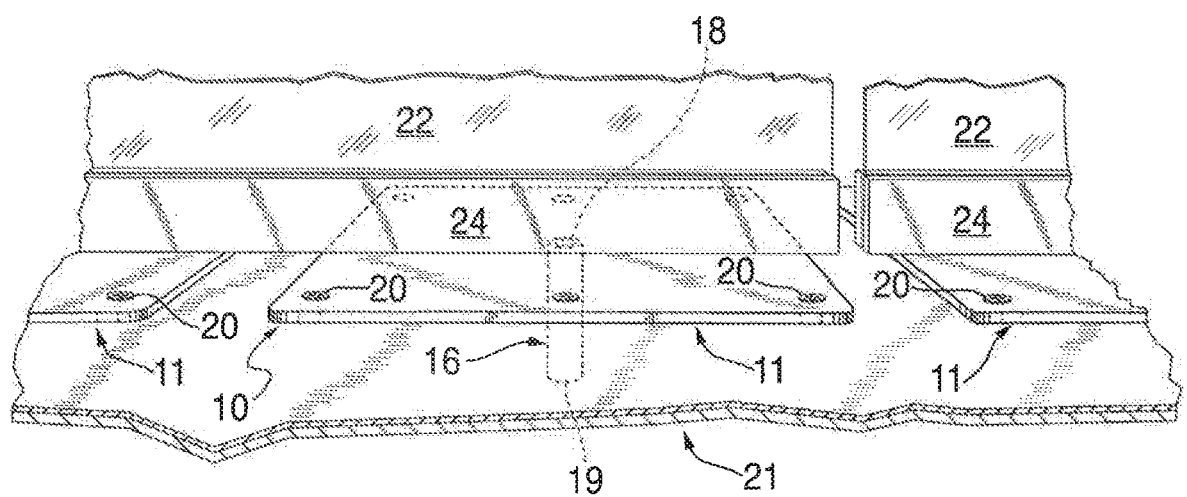
FIG. 3 is a fragmentarily-illustrated perspective view of a first embodiment of the anchor platform assembly embodying the present invention employing a plurality of serially-arranged anchor baseplates mounted on a roof deck and anchoring thereto a plurality of spaced apart elongated rails having U-shaped channel or shoe in which, in turn, is mounted on a pair of glass railings.

As shown in FIG. 3, the anchor baseplate 11 of the anchor platform assembly 10 is typically mounted via mechanical fastening elements 20 preferably in the form of nails, bolts, or lag screws, to a roof structure, such as a roof deck, generally designated 21, with its cylindrical post 16 extending through the roof deck 21 and projecting below the roof deck with its closed end 19. The internally threaded and aligned bores 14 and 17 serve as an anchor point for an object to be mounted on the roof deck 21. In this case, the object is a glass railing of the type that has glass panel 22 with a lower edge secured within an elongated U-shaped metal channel or shoe 24. FIG. 3 specifically depicts three serially arranged and spaced apart anchor baseplates 11 to which two glass panels 22 and two shoes 24 are at least partially mounted. In use, such glass railings can be hundreds of feet in length. As can be appreciated, depending on the length of each glass railing 22, two or more anchor baseplates 11 per glass rail 22 may be required as shown in FIG. 3.

Figure 4B:
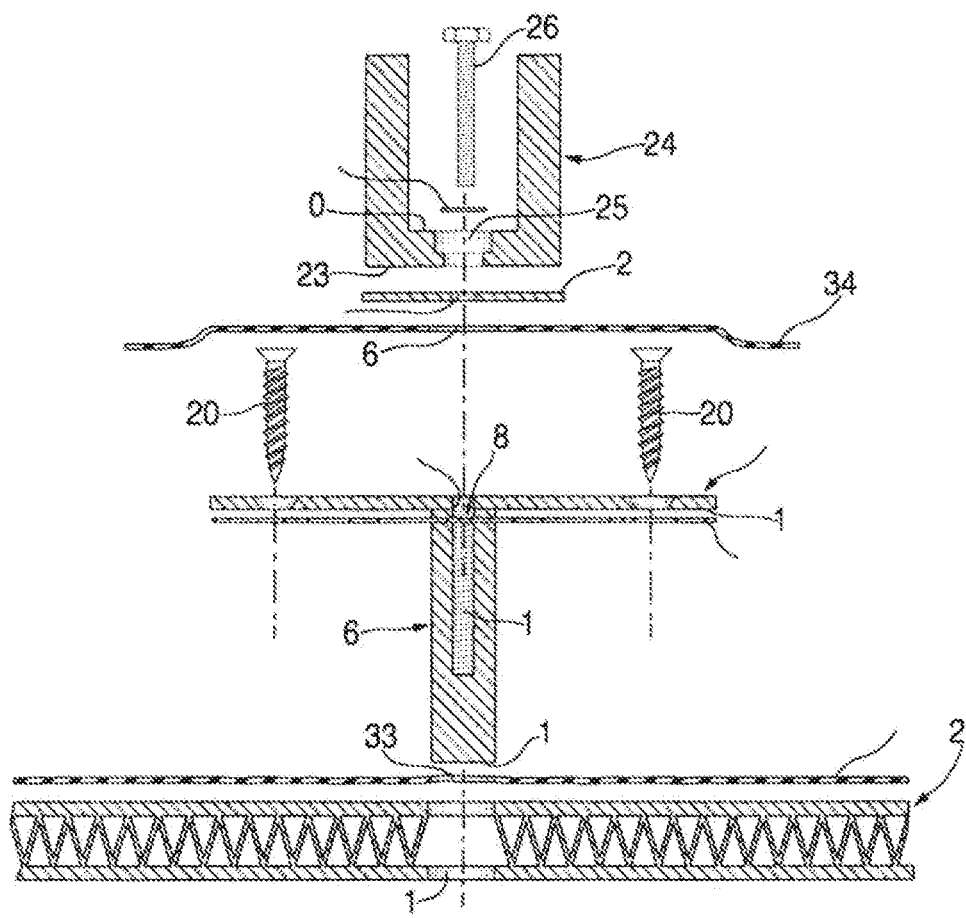
FIG. 4b is an exploded, cross-sectional view of the anchor platform assembly including the anchor baseplate and shim plate shown in FIG. 4a in positional relationship with respect to the U-shaped shoe and the roof deck shown in FIG. 3 and further showing the roof flashing associated therewith including an anchor baseplate membrane and a roof membrane, and the fastening means employed therewith.
Figure 4A:
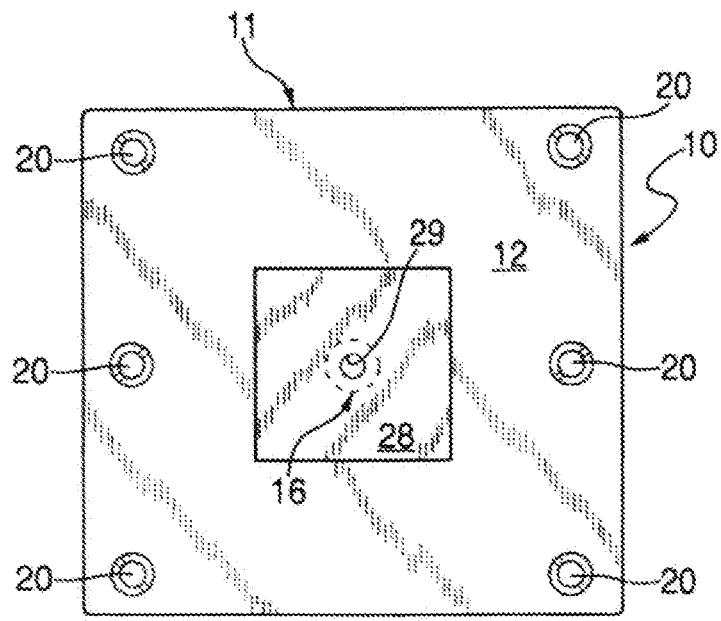
FIG. 4a is a plan view of the anchor baseplate and an optional shim plate centered thereon for adjusting the height of the rail.
Figure 4C:
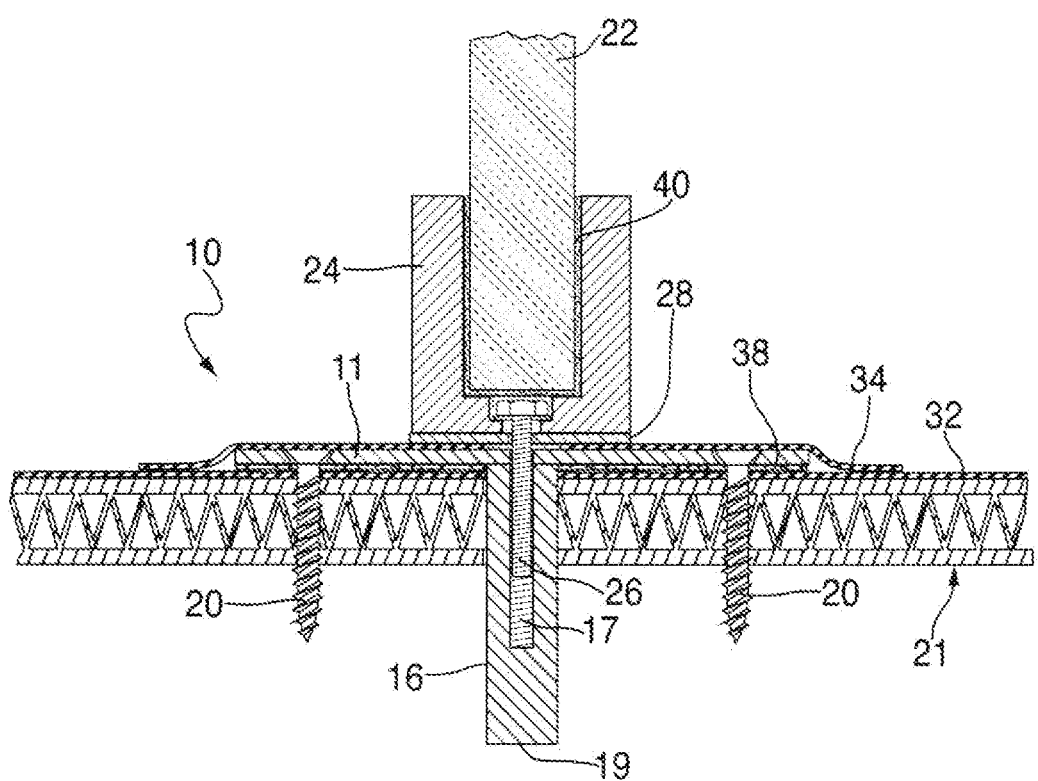
FIG. 4c is a cross-sectional view of the anchor platform assembly shown in FIG. 4b in a fully, mounted state on a roof deck whereby the glass rail is anchored via its U-shaped shoe to the roof, and also showing the use of flashing materials, fasteners and adhesives employed therewith.

As seen best in FIGS. 4a and 4c, an elongated U-shaped shoe 24 has a base wall 23 with a plurality of spaced apart through bores 25 (only one of which is shown). As will be discussed in greater detail hereinafter, cylindrical mechanical fasteners having a straight-thread are used, such as a threaded bolt 26, and washer 27, which bolt 26 is receivable through the through bore 25 of the U-shaped shoe 24 and is receivable within the internally-threaded center bore 14 of anchor baseplate 11 and internally-threaded blind bore 17 of the cylindrical post or rod 16 (FIG. 4c) to anchor the same to the roof deck 21. The cylindrical post 16 with the closed bottom 19 serves two purposes: (1) it provides a relatively sturdy and rigid anchoring support point for the object to be mounted on the roof, and (2) it prevents water from penetrating via the central bore 14 into and below the roof deck 21 as a result of blind bore 17 and the bottom end 19 of the cylindrical rod 16 being closed.

FIG. 4b shows the use of a square-shaped shim plate 28 having a central through bore 29 mounted atop the anchor baseplate 11 such that its central through bore 29 is directly over and in registry with the internal blind bore 17 of the cylindrical post 16. The shim plate 28 is used to adjust the height of the shoe 24 to ensure proper alignment of adjacent shoes 24 and the glass railing(s) 22 they support due to variations in height of the roof deck 21 or the like. Additional shim plates 28 can, of course, be used, if needed, to achieve proper height alignment.

As illustrated in FIGS. 4a and 4c, the central throughbore 25 of the U-shaped channel or shoe 24 contains a step which is dimensioned and configured to receive and support the bolt head of bolt 26 and washer 27 on the step so that the bolt head of bolt 26 is disposed below the top surface 30 of the lower base wall 23 of U-shaped shoe 24 so as not to abut and possibly crack or damage the bottom edge of the glass railing 22.

FIGS. 4a and 4c respectively show an exploded cross-sectional view and a fully mounted cross-sectional of the anchor platform assembly 10 which include preferred flashing materials, fasteners and adhesives and the like for mounting a glass railing to a roof deck or terrace or the like. As shown in FIG. 4a, the anchor baseplate 11 is positioned above the roof deck 21 which may be of wood, metal or composite construction as is standard or conventional in the industry. The cylindrical post 16 of the anchor baseplate 11 is intended to be inserted through a through bore 31 in the roof deck 21 and a throughbore 33 of a conventional rubber roof membrane 32, preferably made of neoprene, and preferably interposed between the anchor baseplate 11 and roof deck 21. Similarly, a conventional rubber roof membrane 34, also preferably made of neoprene, is preferably positioned between the optional shim plate 28 and the top surface 12 of the anchor baseplate 11 and it too is provided with a central bore 36 to allow the bolt 26 to pass through the membrane 34. In addition, a sealant, cement, caulk or adhesive layer 38 is shown which would normally be applied to the bottom surface 13 of the anchor baseplate 11 to adhesively join and seal the same to the roof membrane 32.

As also shown in FIG. 4c, an adhesive, caulk, cement or glue 40 (and/or optionally clips) is also applied to the inner surface of the U-shaped channel 24 so that it surrounds the lower end of glass railing 22 received within the U-shaped metal channel 24. As also illustrated therein, the anchor baseplate membrane 34 extends over the entire anchor baseplate 11 with its ends sealed against the roof membrane 32 thereby sealing the screw holes and the remainder of the anchor baseplate 11. As can be appreciated, these flashing materials and adhesives serve to waterproof the assembly and protect the roof from leaks.

As previously mentioned, this is particularly important at the point of attachment of the object to the roof which, in this case, refers to the point of attachment of the glass railing shoe 24 to the anchor baseplate cylindrical post 16 via bolt 26 and the blind threaded bore 17 in which the bolt 26 is received. Since bore 17 is a blind bore or hole and the bottom 19 end of the cylindrical post 16 is closed, the potential path of any water that could conceivably penetrate between the glass panel 22 and the U-shaped channel 24 and enter the bore 17 of the cylindrical post 16 is totally blocked from penetrating the roof deck 21.

Figure 5A:
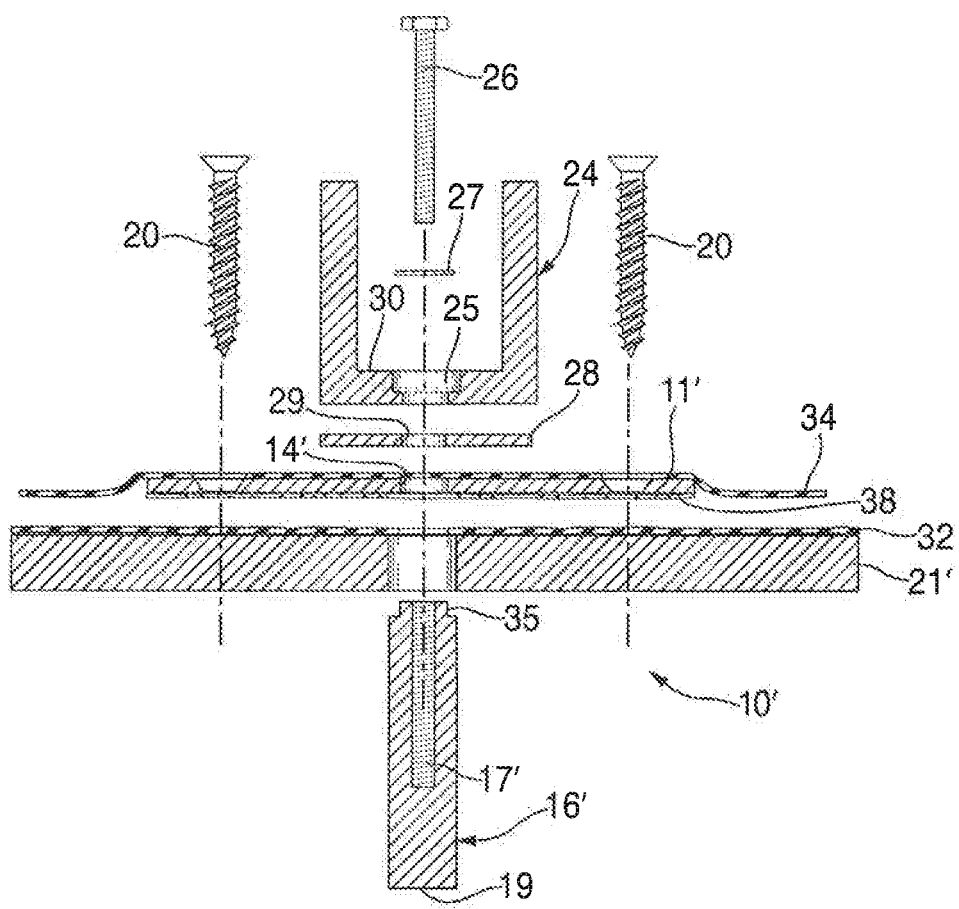
FIG. 5a is an exploded, cross-sectional view of a second embodiment of the anchor platform assembly comparable to FIG. 4b, but showing the anchor baseplate having an internally threaded post with a reduced width neck section.
Figure 5B:
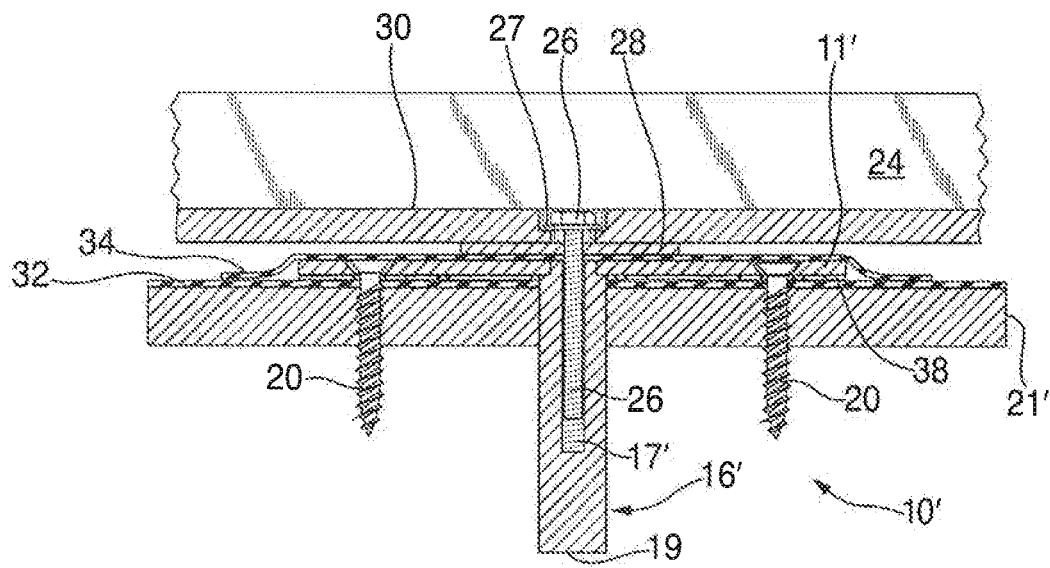
FIG. 5b is a cross-sectional view of the second embodiment of the invention in a fully mounted state, comparable to FIG. 4c, but showing the use of an internally threaded post with a reduced width neck section seated within the central bore of the anchor baseplate.

FIGS. 5a and 5b illustrate a second embodiment of the anchor baseplate assembly 10' and, in a similar fashion, respectively show an exploded cross-sectional view and a fully mounted cross-sectional view of this second embodiment of the anchor platform assembly 10'.

The elements shown in this second embodiment are the same as shown in FIGS. 4a and 4c with the exception that the cylindrical post 16' is provided with a narrow neck portion 35 and the baseplate 11' is provided with a non-threaded central bore 14', but both are otherwise identical to the baseplate 11' and cylindrical post 16 shown in the previous embodiment. In FIGS. 4a and 4c, the top end 18 of the cylindrical post 16 would typically be welded to the bottom surface 13 of the anchor baseplate 11'. In FIGS. 5a and 5b however, the narrow neck section 35 is intended to be received within the non-threaded central bore 14' of the anchor baseplate 11' and as a result of this construction, a more robust, and stronger bond is made. The stronger bond is due to the fact that when anchor plate 11' and post 16' are welded together with the respective center bore 14' and internal threaded bore 17' being held in proper axial alignment by the reduced neck section 35 of the post 16' being received in the center bore 14', the narrow neck portion extending into the non-threaded central bore 14'. Obviously, the materials employed, dimensions and sizing of the various parts of the anchor platform assembly can be modified to suit the particular roof application. For example, in the case of mounting a balcony railing, it would be suitable in certain applications to use 6"×6" baseplates, 4⅛" high×2½" wide aluminum shoes with ½" thick glass panels set into the aluminum shoe with anchoring cement.

Figure 6A:
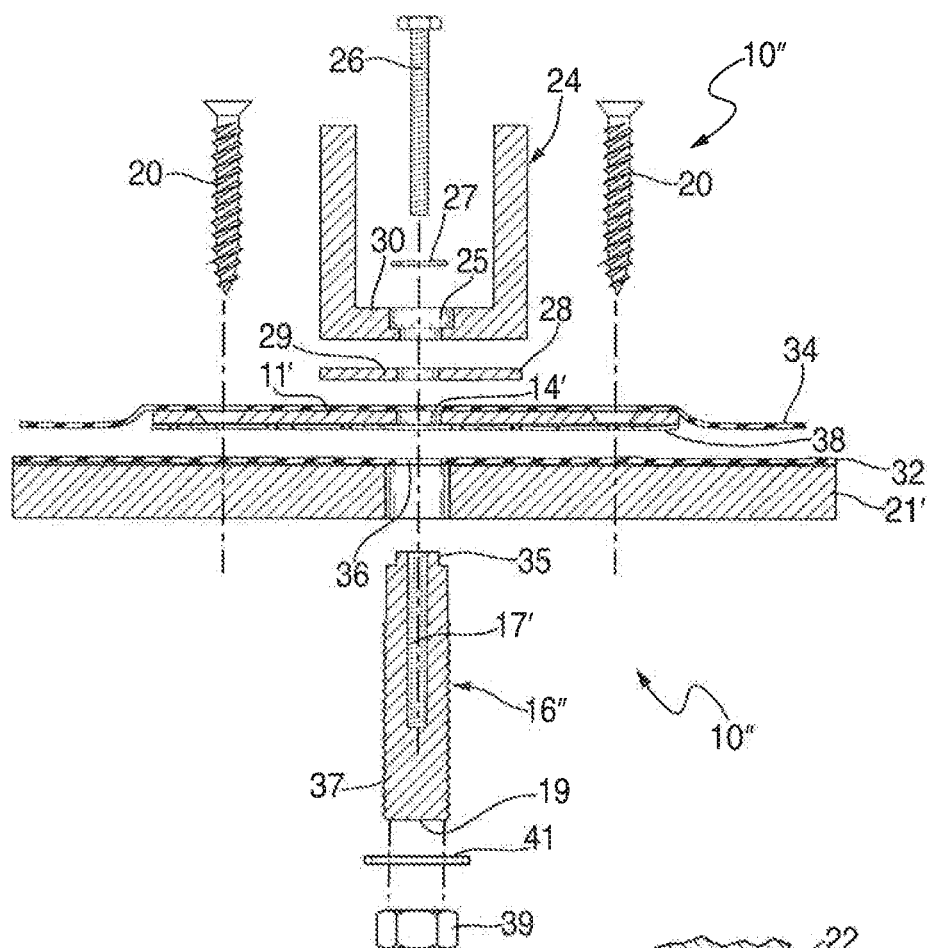
FIG. 6a is an exploded, cross-sectional view of a third embodiment of the anchor platform assembly comparable to that shown in FIGS. 4b and 5a, but showing an anchor baseplate having an externally threaded post.
Figure 6B:
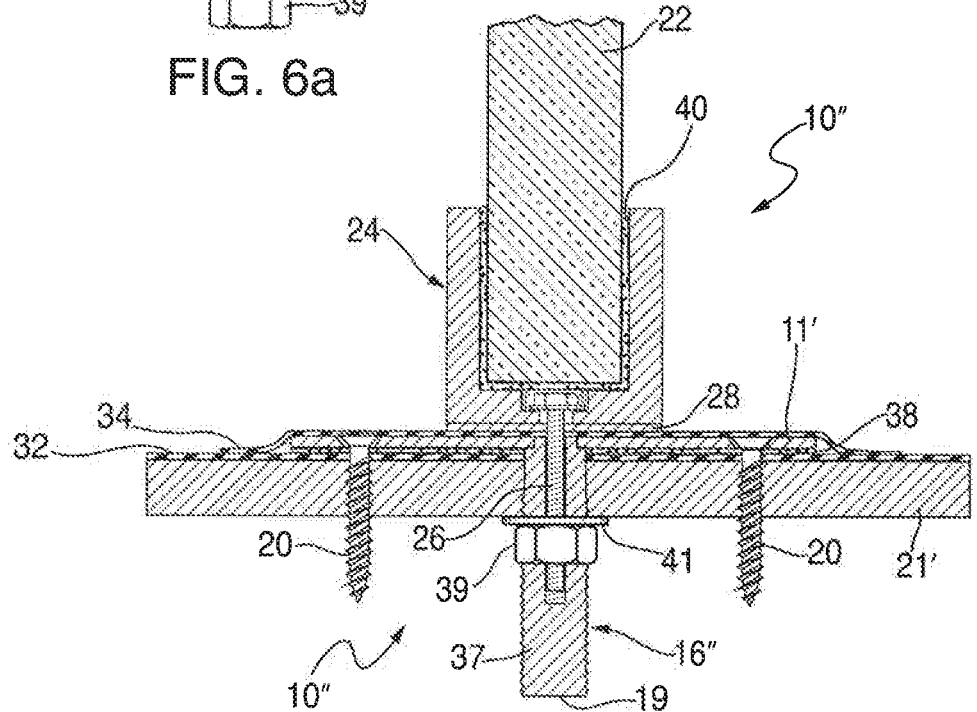
FIG. 6b is a cross-sectional view of the third embodiment of the anchor platform assembly in a fully mounted state comparable to that of FIGS. 4 and 5b, but showing the externally threaded post securing the anchor baseplate to the roof deck from beneath the roof deck via a nut and a washer.

FIGS. 6a and 6b illustrate a third embodiment of the anchor baseplate assembly 10" and, in a similar fashion, respectively show an exploded cross-sectional view and a fully mounted cross-sectional view of this third anchor platform assembly embodiment. The elements shown in this third embodiment are the same as shown in FIGS. 5a and 5b with the exception that the lower portion 37 of cylindrical post 16" is externally threaded but is otherwise identical to the cylindrical post 16'. In this embodiment, a nut 39 and washer 41 are threaded onto the externally threaded surface 37 of the cylindrical post 16" so that in the fully assembled state shown in FIG. 6b, the nut 39 and washer 41 are tightened against the lower surface of the metal roof deck 21' to provide a stronger point of attachment while, at the same time, preventing roof leaks at the point of attachment via the blind bore 17' and the closed end 19 of the cylindrical post 16".

Figure 7A:
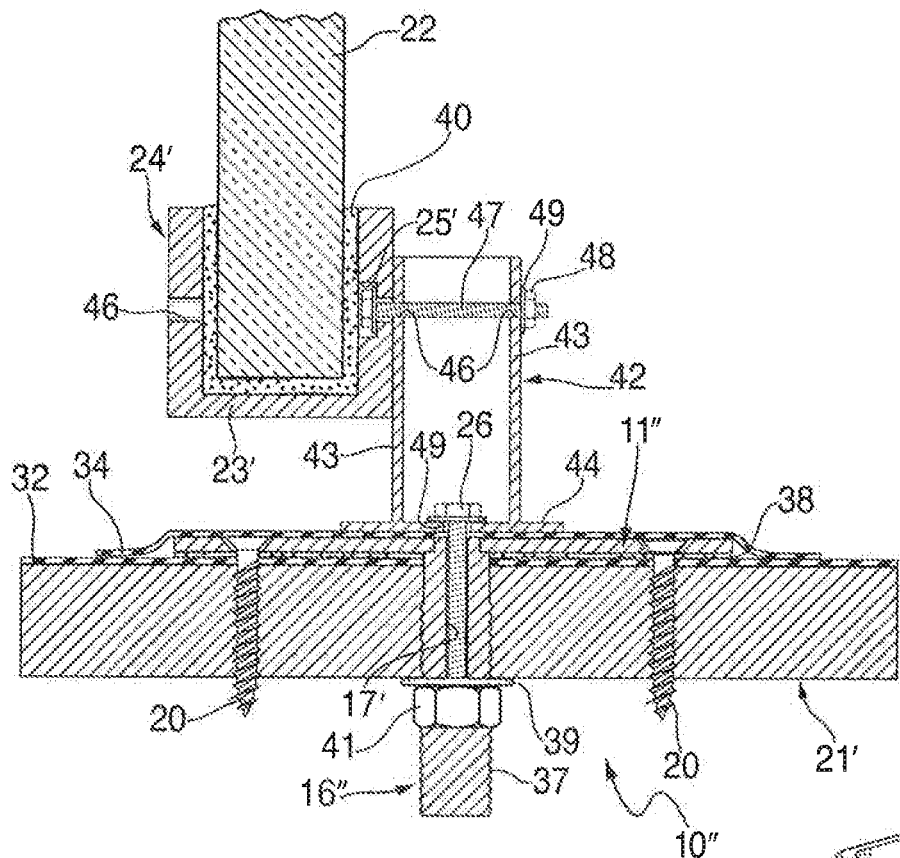
FIG. 7a is a perspective view of an anchor platform assembly accessory unit embodying the present invention for supporting a roof accessory structure in an offset and raised arrangement relative to the anchor base platform and roof deck respectively.
Figure 7B:
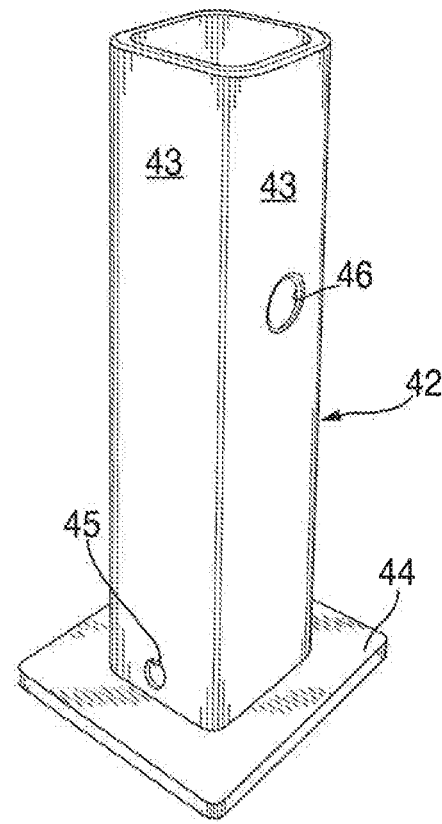
FIG. 7b is a cross sectional view similar to FIG. 6b, but showing the accessory unit supporting the glass railing and its supporting shoe in a raised position spaced above the roof deck and offset from the center hole in the anchor baseplate.

FIGS. 7a and 7b illustrate a novel accessory support stand 42 for the various anchor plate assemblies shown herein which allows the user to support an object in a raised and spaced manner above the anchor baseplate. The accessory support stand 42 comprising a preferably metal, square or rectangular planar base 44 and an upstanding preferably metal square-shaped, tubular body member composed of four sidewalls 43 joined at one end to the planar base 44 by welding. A weep hole 45 is provided at the base of one sidewall 43 to allow water to drain therefrom. The base 44 has a central hole 49 (FIG. 7b) which is alignable with the internally threaded bore 17' of the cylindrical post 16" and the threaded stem of bolt 26 is threadably received within the internally-threaded bore 17' to anchor the support stand 42 to the anchor baseplate 11". At least one set of horizontally aligned holes 46 are formed in opposite side walls 43 of the upstanding tubular body through which a threaded bolt 47 could be mounted to secure an object to one of the sidewalls 43 of the support stand 42 as shown best in FIG. 7b. In this case, the U-shaped channel 24' is provided with a recessed through bore 25' in one of its sidewalls rather than in its base wall 23' as shown in the embodiments of FIGS. 1-6. The bolt 47 is held in the recessed throughbore 25' via its bolt head being held against the step of the channel through bore 25' and at its opposite end (i.e., the free end of its threaded shaft extending through the sidewall hole 46) by an additional nut 48 and washer 48 to secure the U-shaped channel 24' in a raised and elevated position relative to the anchor baseplate 11" and roof member 21' and offset relative to the center blind bore of the anchor baseplate 11".

The remaining figures illustrate various embodiments of the invention of the type heretofore described and illustrated, where the anchor baseplate is angled or bent into two or more wall or panel sections to accommodate likewise angled or bent support structures, such as pitched roofs or roofs having inside or outside corners. Where possible, the parts, elements, or components of the anchor baseplate assembly which are shown in the following embodiments and which are the same or substantially the same as the parts, elements or components previously described and illustrated hereinabove are provided with the same reference numerals preceded by the number "4" for the embodiment in FIG. 8 dealing with a pitched roof and the number "5" for the embodiments in FIGS. 9-18 dealing with inside and outside corners for raised roof abutments or walls.

Figure 8:
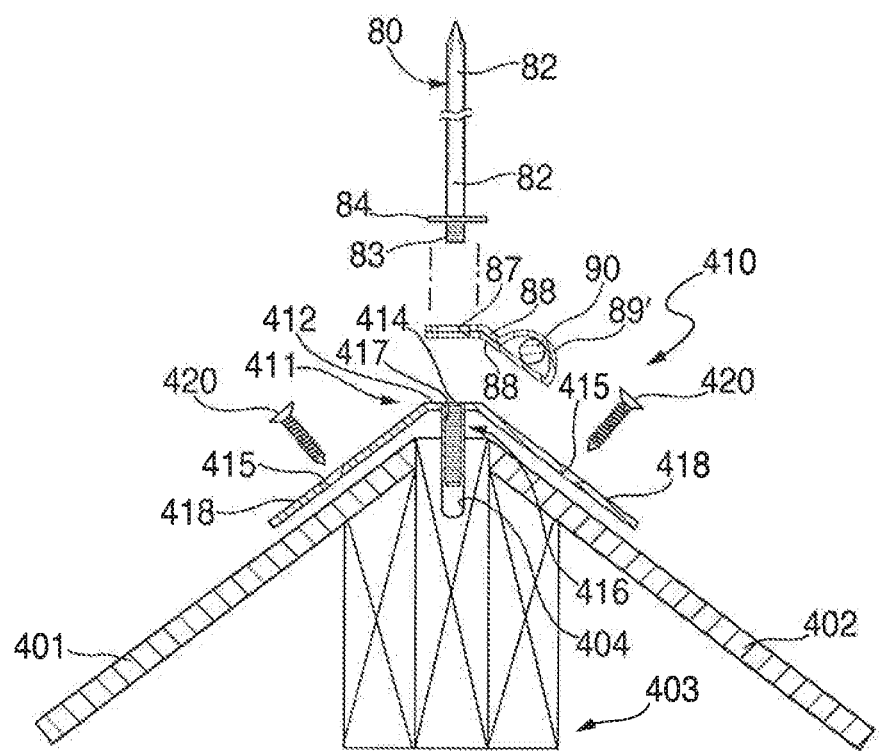
FIG. 8 is an exploded, cross-sectional view of a fifth embodiment of the inventive anchor platform assembly shown supporting a lightning rod along the peak of a pitched roof, and with the flashing materials and adhesives not shown.

More particularly, FIG. 8 illustrates a fourth embodiment of the invention for applications where a lightning rod needs to be mounted on a pitched roof ridge, and which is also described in Applicant's earlier Application No. PCT/US2019/018592. The pitched roof is composed of butted and joined roof sheathing 401, 402 supported by a three-ply roof ridge plate 403. The metallic anchor assembly 410 is provided with a bent baseplate 411 having a central horizontally-disposed central planar section 412 in which a central bore 414 is formed and from which depends a cylindrical post 416 which is received within a bore 404 of the roof ridge plate 403. The base plate 411 has two bent wing sections 418 extending from opposite sides of the central planar section 412 which are angled to lie flat against the roof sheathing 401, 402. As before, baseplate 411 would be attached to the roof sheathing 401, 402 via fastening screws 420 received through holes 415 in the bent wing sections 417. Flashing and adhesive materials (not shown) as used in the other embodiments would be used in a like manner as before as well.

The cylindrical post 416 can optionally be smooth as is the case shown in FIG. 8 or its outer surface can be externally threaded as also shown in the earlier embodiments. It further has an internally-threaded central bore 417 in which the threaded lower section 83 of a lightning rod 80 is threadably receivable so that its upper pointed section 82 projects upwardly preferably from the highest point on the roof. In applications like this, the grounding cable 90 usually runs along the roof ridge to connect to a plurality of spaced-apart lightning rods 82 (not shown) also via conventional clamps 89 or the like and the grounding cable would then be guided to the ground where it would be attached to a grounding grid or plate in the ground (not shown).

Figure 9A:
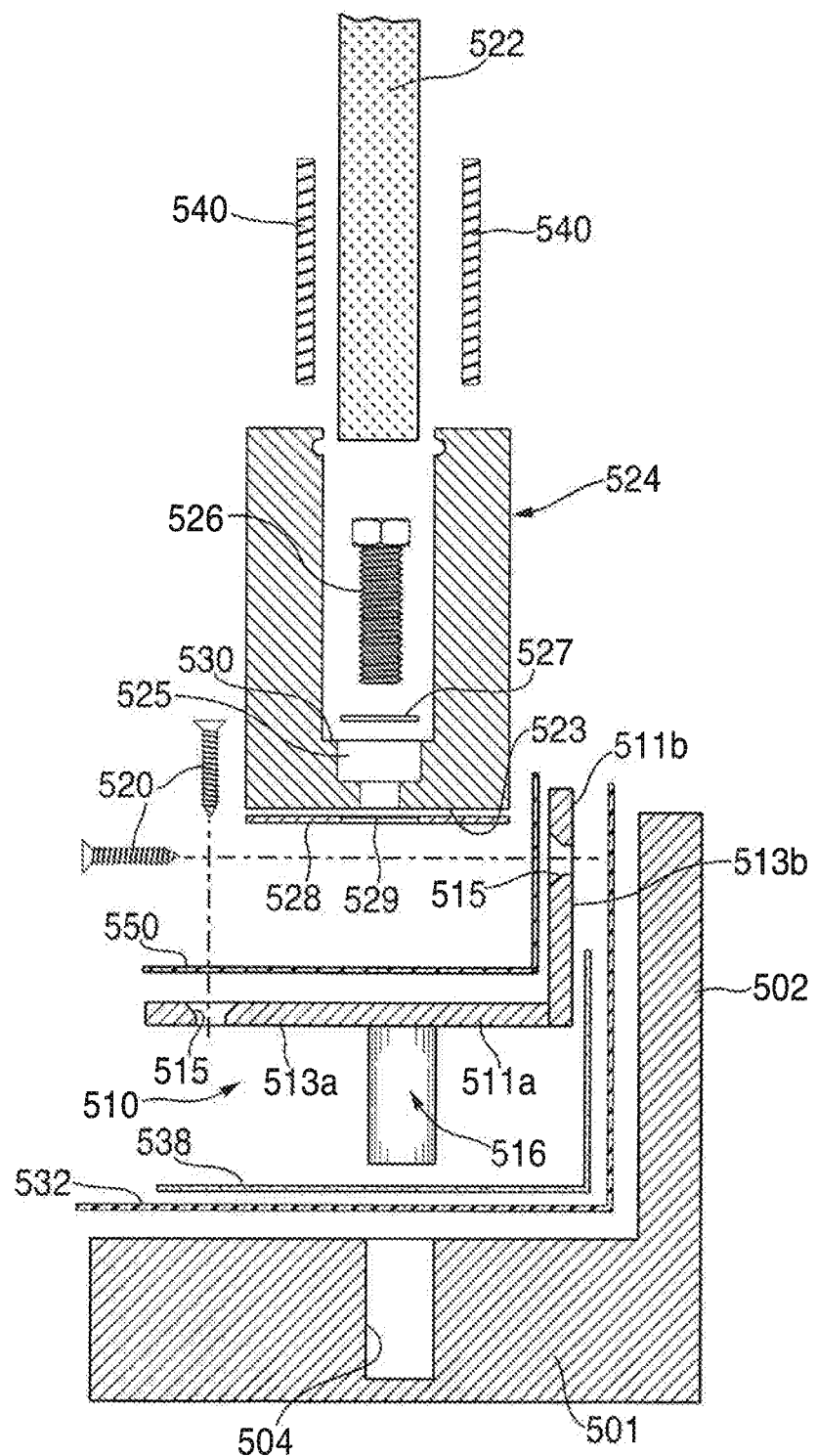
FIG. 9a is an exploded, side sectional view of a sixth embodiment of the novel anchor baseplate assembly embodying the present invention shown having a smooth cylindrical post mounted on an inside corner of a roof support structure.
Figure 9B:
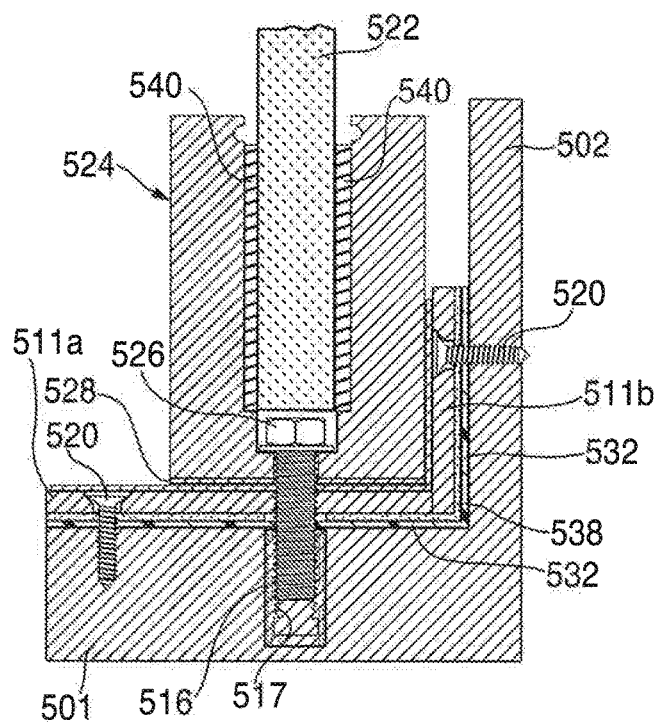
FIG. 9b is a side sectional view of the novel anchor baseplate assembly shown in FIG. 9a in a fully mounted state on an inside corner of a roof support structure.
Figure 9C:
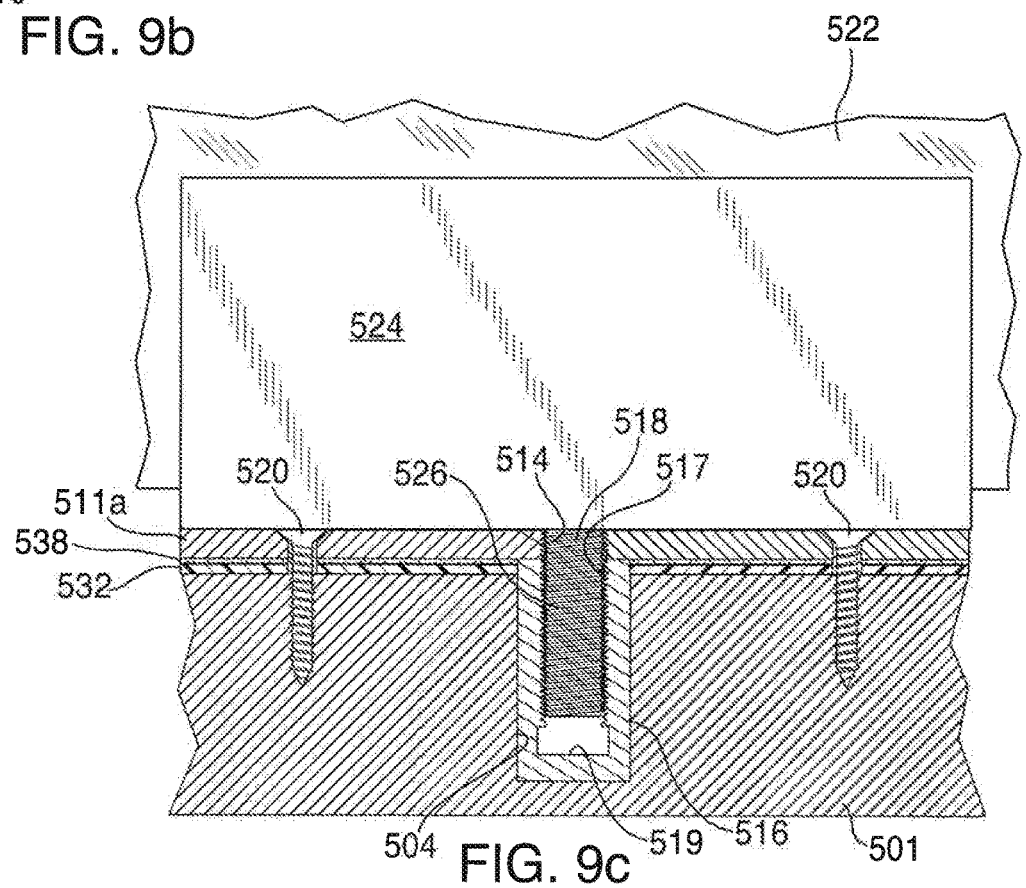
FIG. 9c is a fragmentarily-illustrated, front elevational view, in part section, of the novel anchor baseplate assembly shown in FIG. 9a in a fully mounted state on an inside corner of the roof support structure.

FIGS. 9a, 9b, 9c illustrate a sixth embodiment of the inventive anchor platform assembly, generally designated by reference numeral 510 and configured for securing an object 524, in this example, a U-shaped shoe 524 for supporting a glass rail 522 to an inside corner of a roof ledge or the like. The inside corner of the roof is formed at a substantially right angle juncture between a horizontal wall portion 501 disposed perpendicularly to a vertical wall portion 502 of a roof wall or other raised structure.

Anchor platform assembly 510 includes an anchor baseplate, generally designated by reference numeral 511. Anchor baseplate 511 as shown is L-shaped and has two angled sides, sidewalls or panels 511a, 511b, which extend substantially perpendicularly relative to one another to permit the same to be positioned abutting the inside corner defined by roof walls 501, 502. The baseplate 511a includes a central bore 514, which may or may not be threaded, and a plurality of other throughbores 515 utilized for attaching the baseplate 511 to the roof sheathing 501, 502 proximate the roof inside corner. The baseplate 511 is attached to the roof sheathing 501, 502 via fastening screws 520 received by and passing through the throughbores or holes 515 to secure the baseplate 511 to the roof 501, 502, at the inside corner. Typically, flashing materials such as a roof membrane 532 could be secured to the roof structure 501, 502 and an adhesive or caulk 538 would be applied thereto or to the undersides 513a, 513b of anchor baseplate sidewalls 511a, 511b, respectively. The baseplate 511 may be formed as a single, integrated, one-piece unit, comprising the two angled or bent sidewalls, sides or panels 511a, 511b, or the panels can be fastened together (such as by welding) to realize a baseplate particularly suited or configured for inside roof corners.

As seen best in FIGS. 9b and 9c, the anchor platform assembly 510 also includes a cylindrical rod or post 516. The cylindrical rod or post 516 has a smooth outer cylindrical surface in this embodiment, as well as an internally-threaded central bore 517 within which a threaded lower section of a bolt 526 is threadably receivable (FIG. 9c). The central bore 517 of cylindrical post 516 is a blind bore, which is advantageous for the reasons explained above. The post or rod 516 has a top open end 518 and a closed bottom 519 (FIG. 9c). The cylindrical rod or post 516 is secured to the anchor baseplate 511, so that the top open end 518 of its bore 517 abuts and is in registry with the bottom open end of center throughbore 514. The bore 514 of the baseplate 511 is aligned with the central bore 517 of the cylindrical rod or post 516 as seen best in FIG. 9c to effectively cooperatively define a blind bore extending from the top surface of sidewall 511a to the bottom wall 519 of post bore 517. The post 516 when mounted sits in a similarly dimensioned and configured cylindrical blind bore 504 formed in roof portion 501.

As best illustrated in FIG. 9a, the central throughbore 525 of the U-shaped channel of shoe 524 contains a step 525 which is dimensioned and configured to receive and support the bolt head of bolt 526 and, optionally, a washer 527. Consequently, the bolt head of bolt 526 is disposed below a top surface 530 of the lower base wall 523 of U-shaped shoe 524 in order to prevent the bolt 526 from abutting and possibly cracking or damaging the bottom edge of the glass railing 522.

In addition, a conventional rubber support clip [not shown] or adhesive caulk or sealant 540 is optionally provided on the sides of the lower end of glass rail 522 or the inner sidewalls of U-shaped channel 524 to secure the rail 522 in a cushioned manner to prevent movement and cracking thereof. Although not shown, the support clip or sealant 540 could also extend under the lower end of glass rail 522 or on basewall 530. Here too, one or more shim plates 528 as also shown in FIG. 4b having a central bore 529 can be used to adjust the height at the shoe 524. In addition, flashing in the form of a rubber membrane 550 can be positioned below shoe 524 or shim plate 528 and above anchor baseplate 511 for further waterproof protection.

Figure 10A:
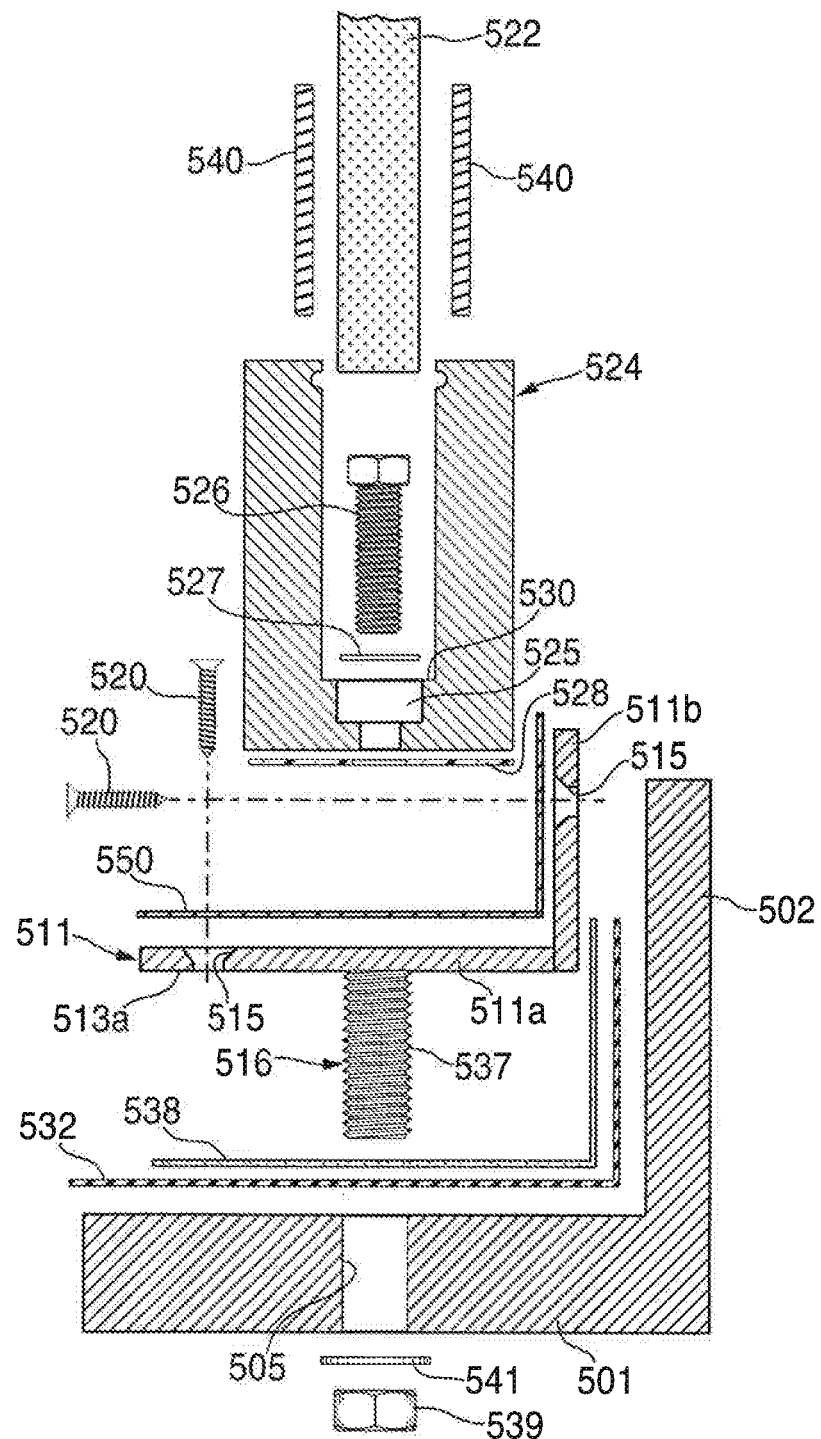
FIG. 10a is an exploded, side elevational view of the novel anchor baseplate assembly embodying the present invention, similar to FIG. 9a, except it shows the use of a threaded cylindrical post mounted on an inside corner of a roof support structure.
Figure 10B:
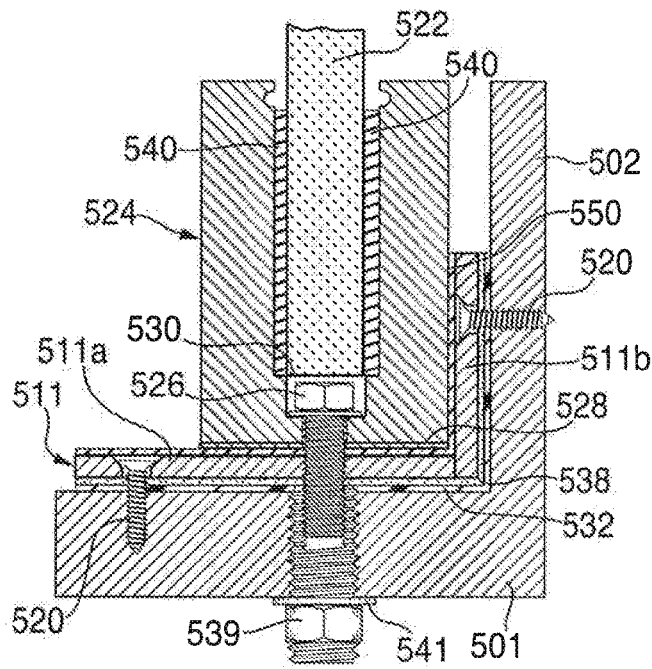
FIG. 10b is a side sectional view of the novel anchor baseplate assembly shown in FIG. 10a in a fully mounted state on an inside corner of a roof support structure.
Figure 10C:
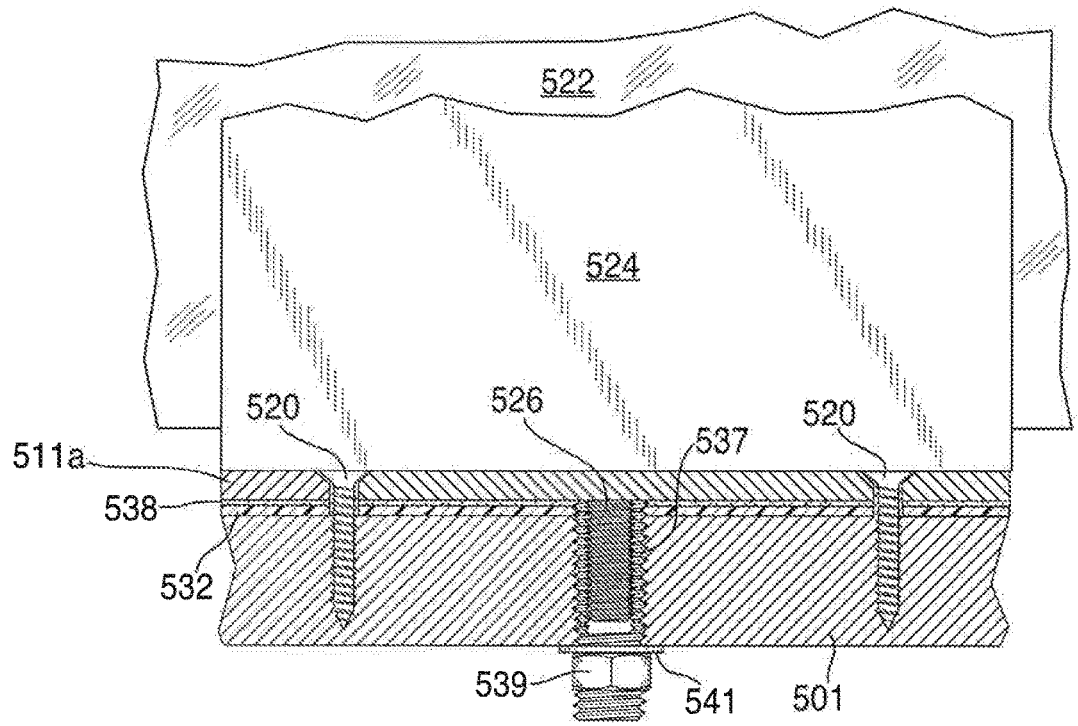
FIG. 10c is a fragmentarily-illustrated, front elevational view, in part section, of the novel anchor baseplate assembly shown in FIG. 10a in a fully mounted state on an inside corner of the roof support structure.

Turning now to FIGS. 10a, 10b and 10c, therein illustrated is an anchor baseplate assembly essentially identical to the components and manner of mounting thereof to that shown in FIGS. 9a-9c, and therefore the description thereof is substantially identical thereto and is not repeated hereinbelow, except for the fact that the rod or post 516 has a threaded outer surface 537. This threaded version of the post 516 is particularly useful where there is access to the underside of the roof 501 to permit the post 516 to be inserted through a throughbore 505 in the wood roof sheathing 501 to allow a mechanical fastener, such as a washer 541 and nut 539 to be threaded onto the free end of the externally threaded post 516. It is then tightened to secure and lock the anchor baseplate 510 in abutting relationship with roof portion 501 from therebelow as seen best in FIG. 10b.

FIGS. 11a, 11b, 11c, 12a, 12b, 12c and 13a, 13b, 13c illustrate several different options or variations of the embodiments of the anchor platform assembly embodying the present invention for use in association with an inside corner of a support structure such as found on certain building roofs. Here too, the components, flashing materials and installation thereof are essentially same as heretofore described in relation to FIGS. 9a, 9b, and 9c and therefore the same is not repeated herein. Consequently, only the different options associated with the anchor baseplate assembly 510 and, in particular, anchor baseplate 511 and the post 516 are described and illustrated.

Figure 11A:
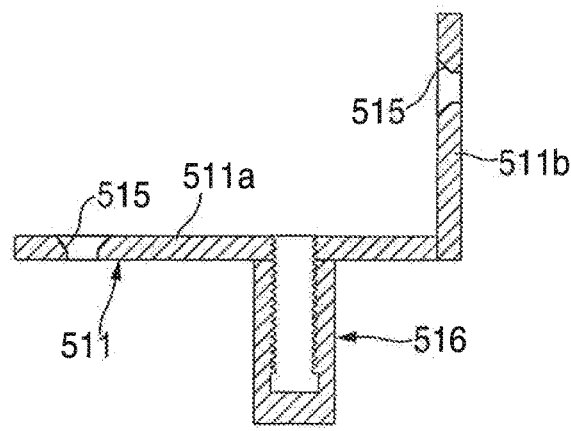
FIG. 11a is a side sectional view of the novel anchor baseplate assembly embodying the present invention shown having two smooth cylindrical posts for mounting on an inside corner of a roof support structure.
Figure 11B:
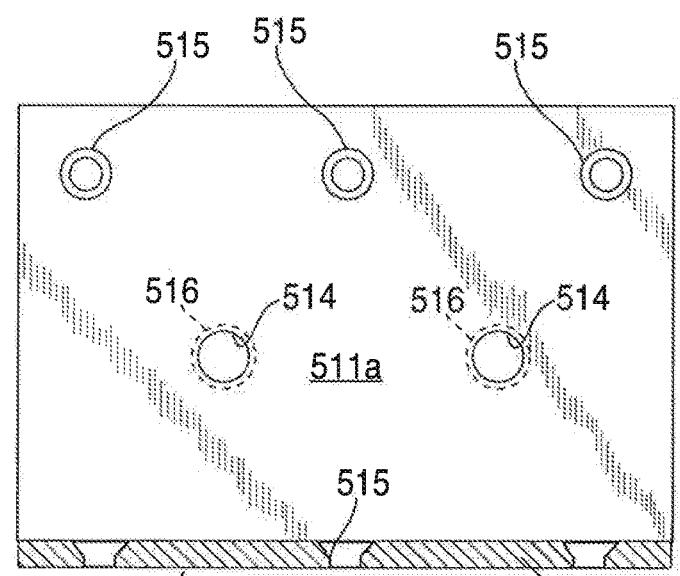
Figure 11C:
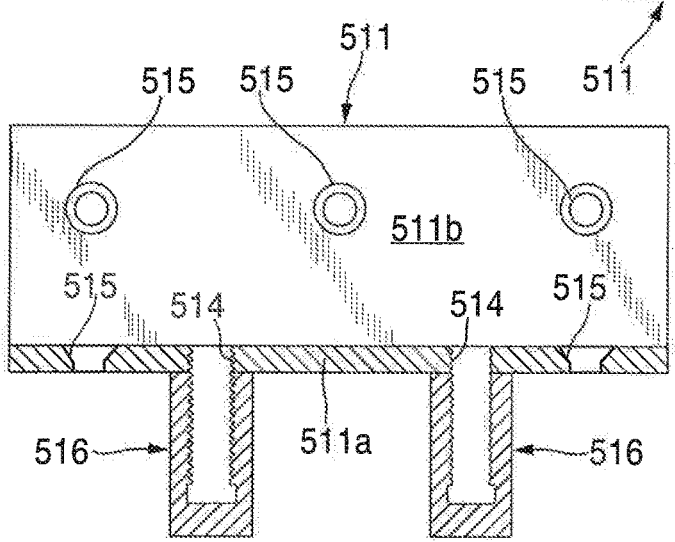

More particularly, FIGS. 11a, 11b, 11c show the employment of two spaced-apart smooth posts 516 secured to, and depending from the horizontally-disposed anchor baseplate sidewall 511a. The vertically-disposed sidewall 511b of baseplate 511 has three throughbores 515 for receiving therein mechanical fasteners, such as screws or bolts, to secure the anchor baseplate against the vertical roof wall 502 and three spaced-apart throughbores 515 in the horizontal-disposed sidewall 511a for securing the same via mechanical fasteners, such as screws or bolts, to the horizontally-disposed sidewall 501 of the inside corner.

Figure 12A:
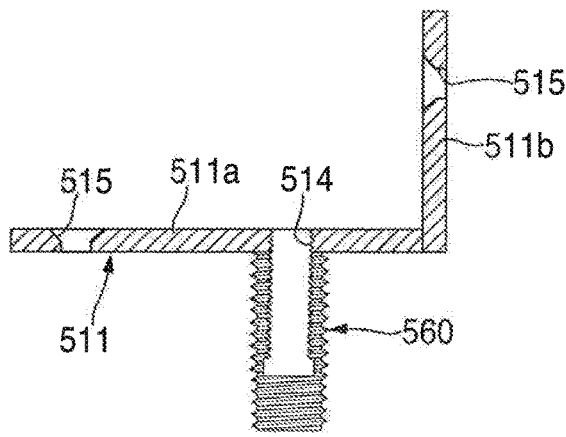
FIG. 12a is a side sectional view of the novel anchor baseplate assembly embodying the present invention shown having two threaded cylindrical posts for mounting on an inside corner of a roof support structure.
Figure 12B:
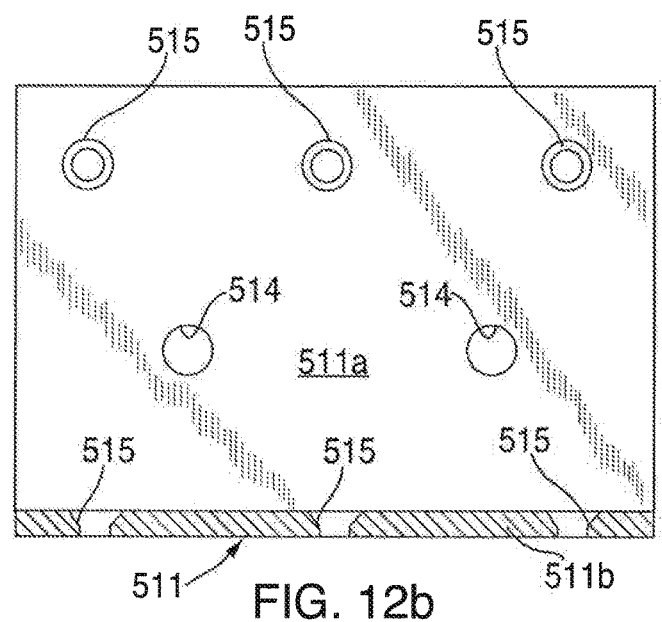
Figure 12C:
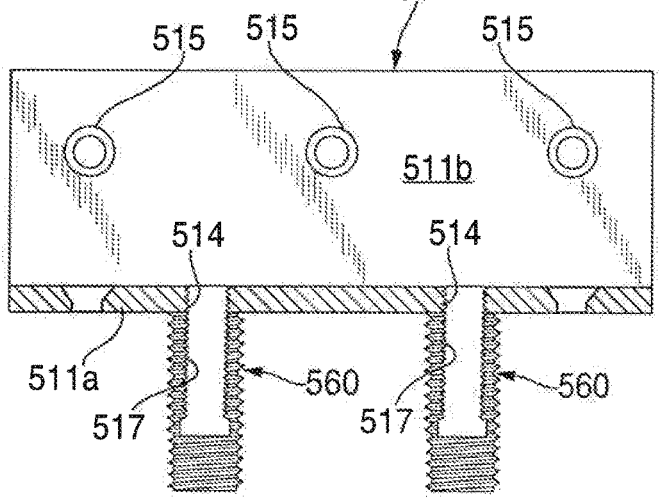

FIGS. 12a, 12b, 12c are identical to the corresponding views of FIGS. 11a, 11b, 11c except that, instead of a pair of spaced apart smooth posts 516, a pair of spaced-apart posts 516 have a threaded outer surface 537 are employed.

Figure 13A:
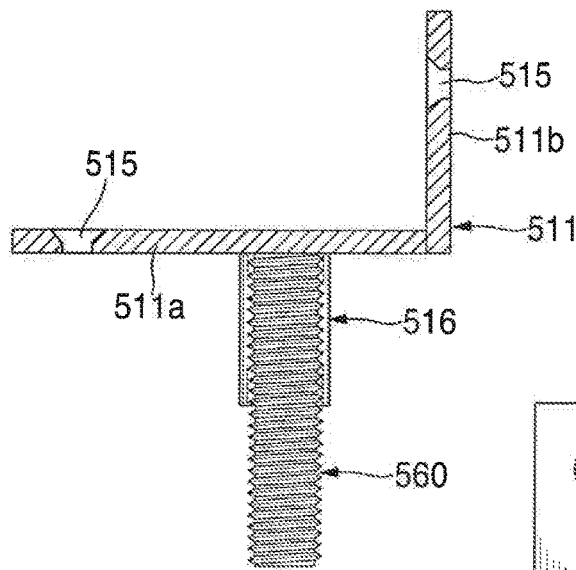
FIG. 13a is a side sectional view of the novel anchor baseplate assembly embodying the present invention shown having one smooth cylindrical post and two studs for mounting on an inside corner of a roof support structure.
Figure 13B:
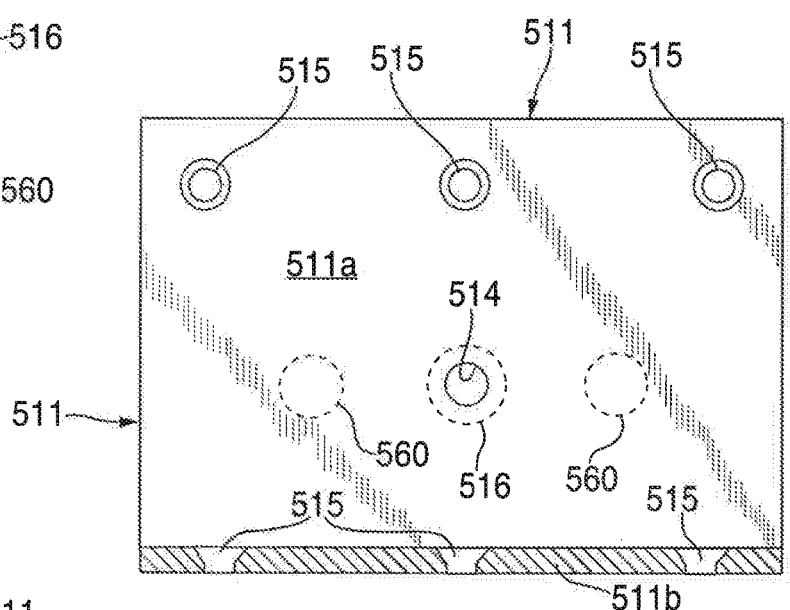
Figure 13C:
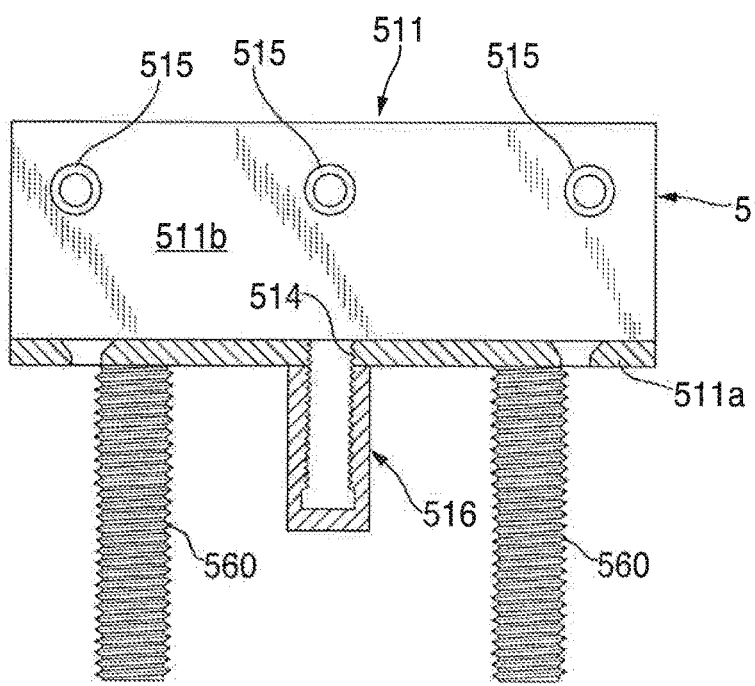

FIGS. 13a, 13b, 13c is comparable to FIGS. 9a, 9ab, 9a in that it has a single smooth post 516 (although it could optionally be externally threaded), but it also has two cylindrical, externally-threaded fastening studs 560 disposed spaced-apart and on opposite sides of the single post 516. The fastening studs 560 would typically be welded to the underside of angle baseplate sidewall 511a and they would each be inserted through a hole in the roof structure similar to hole 505 so that they could be fastened to the support structure (not shown), from below, with the aid, e.g., of a washer 541 and threaded nut 539 to provide a much stronger joint and anchor.

Figure 14A:
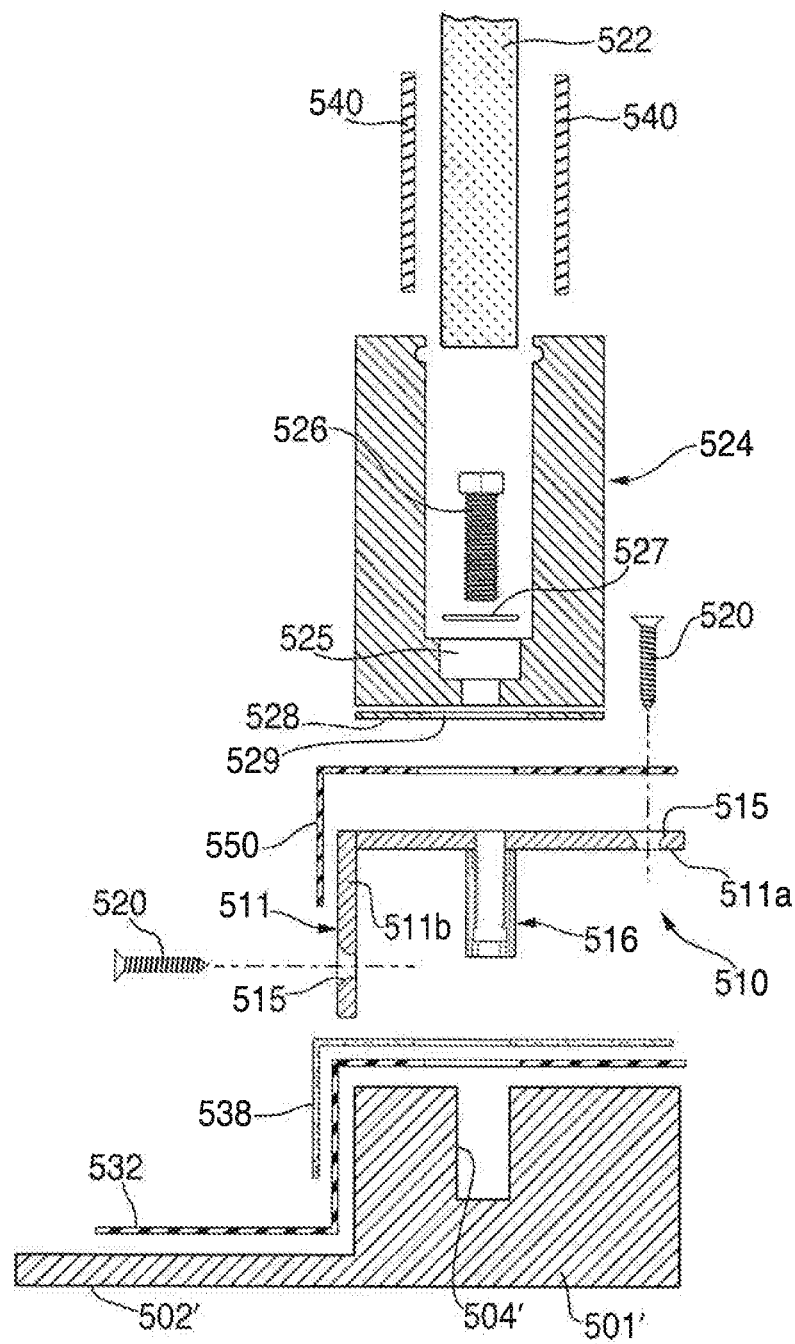
FIG. 14a is an exploded, side sectional view of a novel anchor baseplate assembly embodying the present invention shown having a smooth cylindrical post mounted on an outside corner of a roof support structure.
Figure 14B:
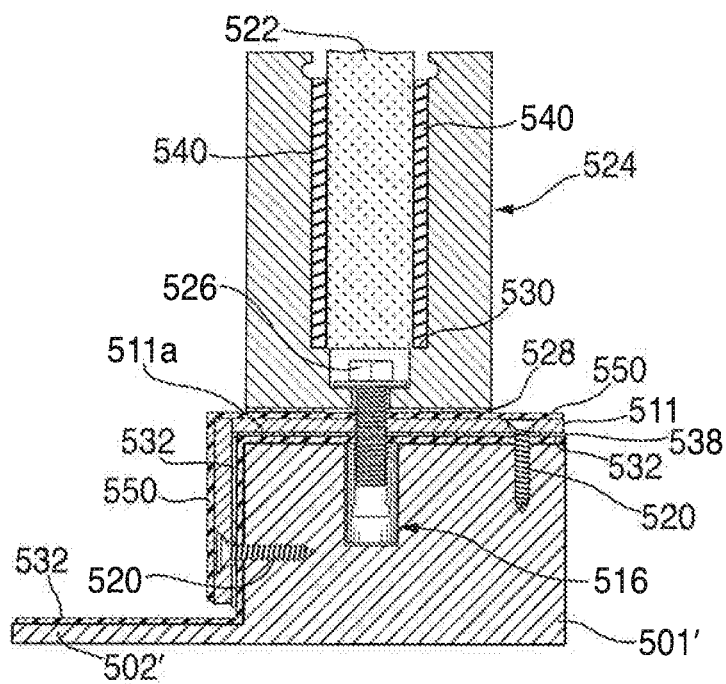
FIG. 14b is a side sectional view of the novel anchor baseplate assembly shown in FIG. 14a in a fully mounted state on an outside corner of a roof support structure.
Figure 14C:
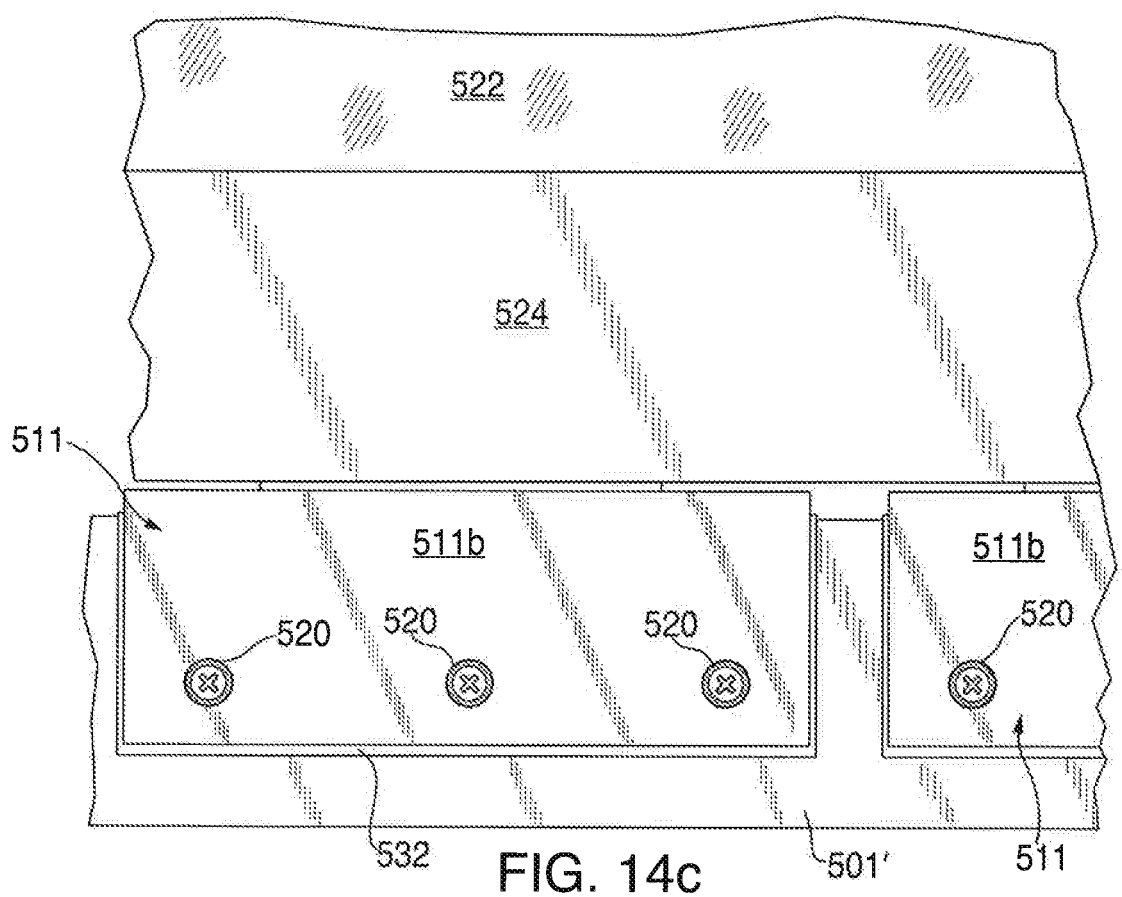
FIG. 14c is a fragmentarily-illustrated, front elevational view of the novel anchor baseplate assembly shown in FIG. 14a in a fully mounted state on an outside corner of a roof support structure.
Figure 15A:
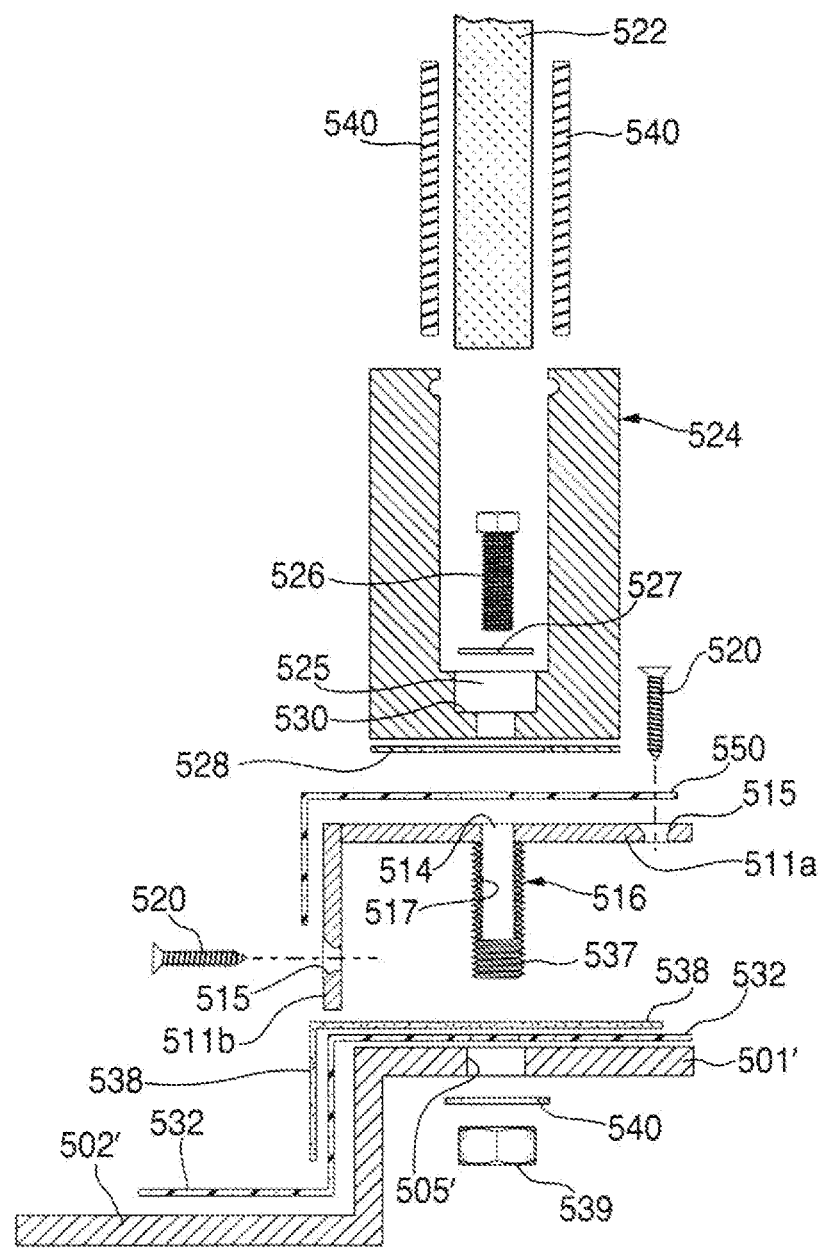
FIG. 15a is an exploded, side elevational view of a novel anchor baseplate assembly embodying the present invention shown similar to FIG. 14a, except it shows the use of a threaded cylindrical post mounted on an outside corner of a roof support structure.
Figure 15B:
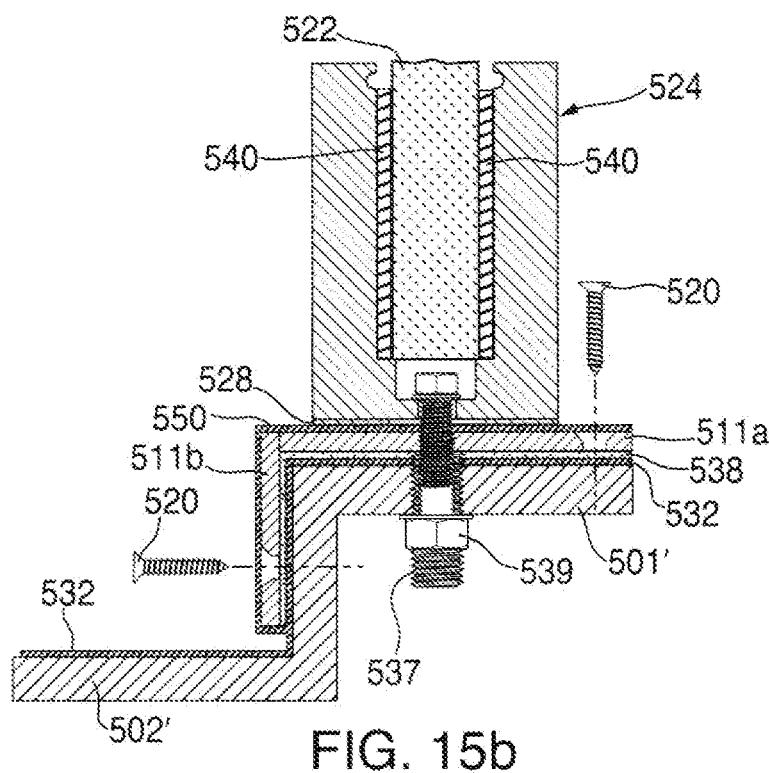
FIG. 15b is a side elevational view of the novel anchor baseplate assembly shown in FIG. 15a in a fully mounted state on an outside corner of a roof support structure.
Figure 15C:
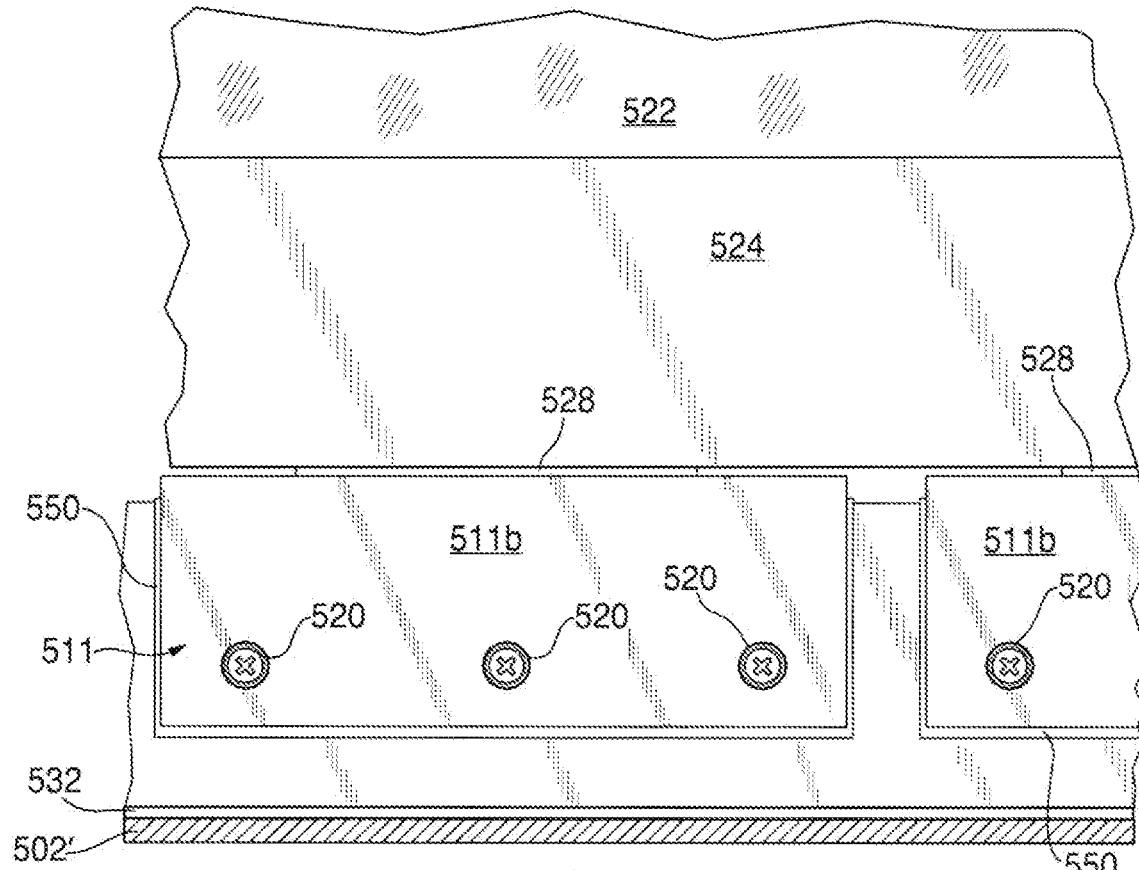
FIG. 15c is a fragmentarily-illustrated, front elevational view of the novel anchor baseplate assembly shown in FIG. 15a in a fully mounted state on an outside corner of the roof support structure.

FIGS. 14a, 14b, 14c, and 15a, 15b, 15c illustrates a seventh embodiment of the inventive anchor platform assembly for securing an object 524 (again a glass rail shoe 524) to an outside corner of a roof portion. The outside corner of the roof comprising opposing portions of plywood roof sheathing 501', 502', arranged substantially perpendicular to each other to define an outside corner. The only difference between the two sets of figures is that FIGS. 14a-14c show the use of a post 516 with a smooth external surface receivable in a similarly configured cylindrical bore 504' in the upper surface of roof section 501' and FIGS. 15a-15c show a post 516 with an externally threaded surface 537 receivable through a throughbore 505' in the upper horizontal wall roof section 501' which is fastened via a washer 540 and nut 539 from below the roof.

The L-shaped base plate 511 has two opposing sides, sidewalls, or panels 511a and 511b extending substantially perpendicularly to each other which are generally the same as shown in connection with the baseplate 511 shown heretofore in association with any inside corners of a roof except that panel 511b depends downwardly from an end of panel 511a rather than extending upwardly therefrom as shown in FIGS. 9-13. Thus, as shown, side 511a overlies the horizontally-extending raised roof section 501' and side 511b' depends downwardly from one end of side 511a to overlie the vertically-extending side of raised roof section 501' which connects to horizontally-extending roof section 502' or against flashing (comprising a conventional rubber roof membrane 532 and caulk 538). And, as in the earlier embodiments, the baseplate 511 is attached to the roof sheathing 501', via fastening screws 520 received through holes 520 in the opposing sides 511*a* and 511*b* of the baseplate 511.

Here too, since the components, construction, and installation of the anchor baseplate assembly shown in FIGS. 14*a*, 14*b*, 14*c* and 15*a*, 15*b*, 15*c* are essentially the same as described in relation to FIGS. 9*a*, 9*b*, 9*c* and 10*a*, 10*b*, 10*c*, respectively, aside from the nature of their application to either an inside or outside corner, the same description thereof is not repeated herein.

Similarly, FIGS. 16*a*, 16*b*, 16*c*, 17*a*, 17*b*, 17*c* and 18*a*, 18*b*, 18*c* illustrate several different options or versions of the anchor baseplate assembly of the present invention for use in association with an outside corner of a support structure such as found on certain building roofs as well. As will be discussed in greater detail below, as before, these other embodiments show the utilization and employment of multiple spaced-apart posts 516 and also the employment of multiple studs 560 to provide additional holding power.

Figure 16A:
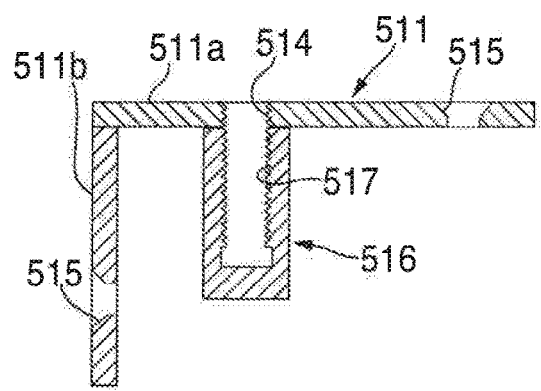
FIG. 16a is a side sectional view of the novel anchor baseplate assembly embodying the present invention shown having two smooth cylindrical posts for mounting on an outside corner of a roof support structure.
Figure 16B:
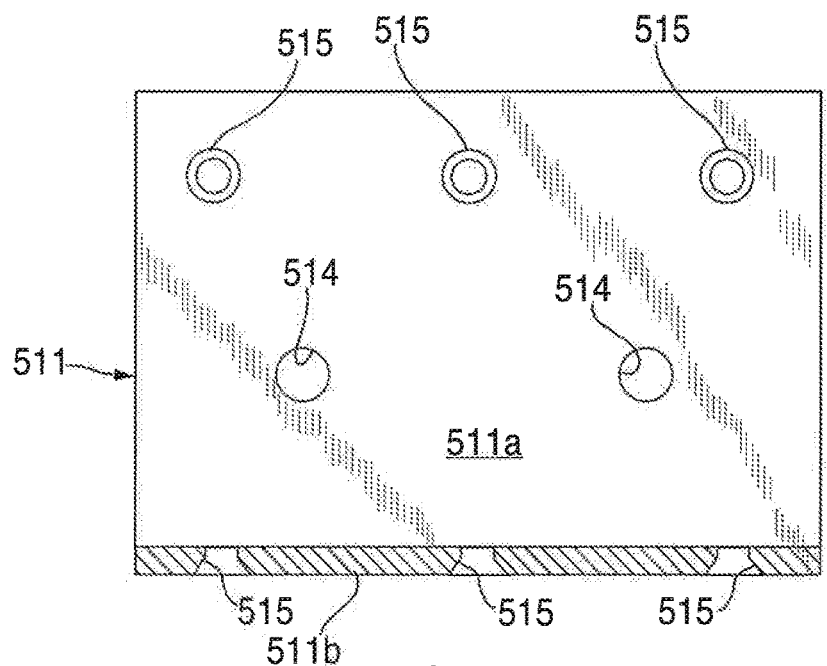
Figure 16C:
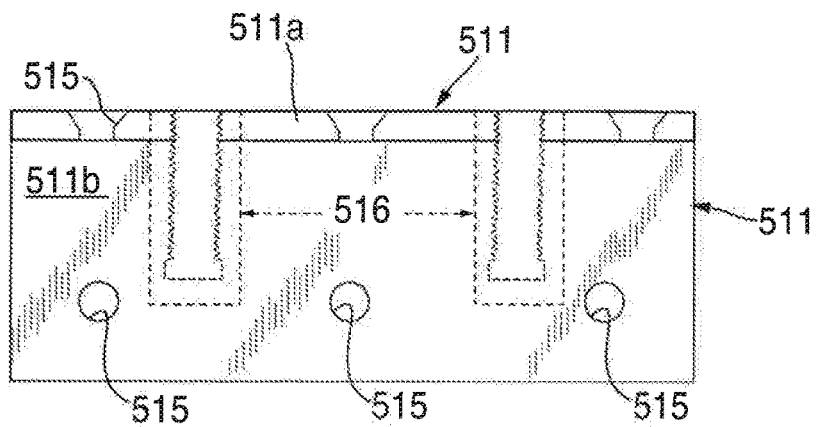

More particularly, FIGS. 16*a*, 16*b*, and 16*c* show the employment of two spaced-apart smooth posts 516 secured to, and depending from the horizontally-disposed anchor baseplate sidewall 511*a*. The vertically-disposed sidewall 511*b* of baseplate 511 has three, spaced-apart throughbores 515 for receipt therein of mechanical fasteners, such as screws or bolts, to secure the anchor baseplate 511*b* against the vertical wall of roof section 501' of the outside corner and three spaced-apart throughbores in the horizontal-disposed sidewall 511*a* for securing the same via mechanical fasteners, such as screws or bolts, to the horizontally-disposed top surface of roof section 501' of the outside corner. Two posts 516 having externally-threaded outside surfaces 537 (not shown) can, of course, be substituted for the smooth posts 516.

Figure 17A:
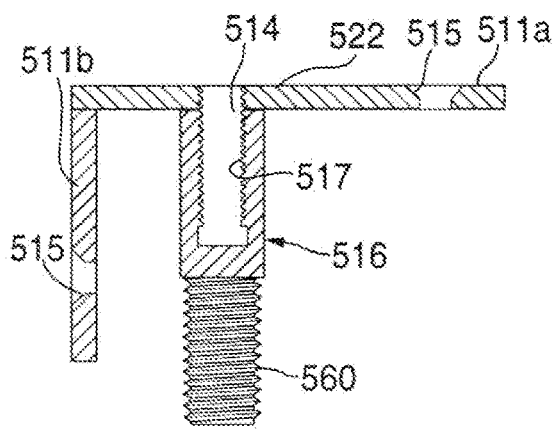
FIG. 17a is a side sectional view of the novel anchor baseplate assembly embodying the present invention shown having one smooth cylindrical post and two studs for mounting on an outside corner of a roof support structure.
Figure 17B:
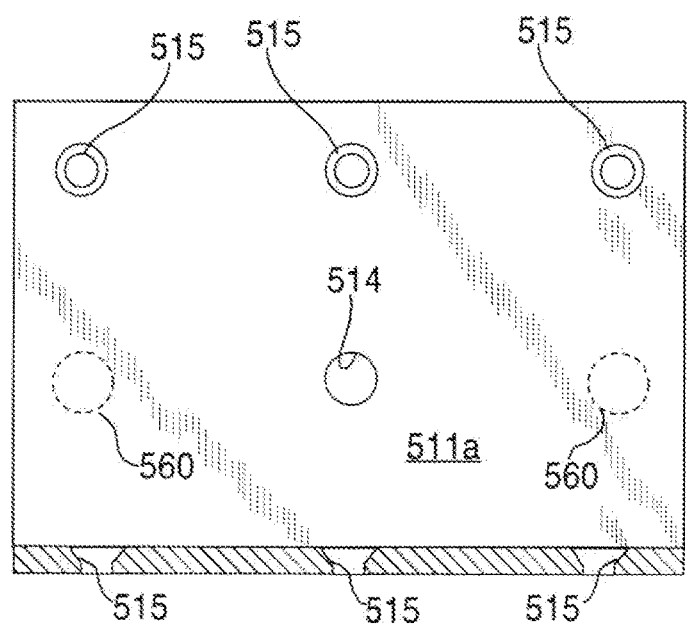
Figure 17C:
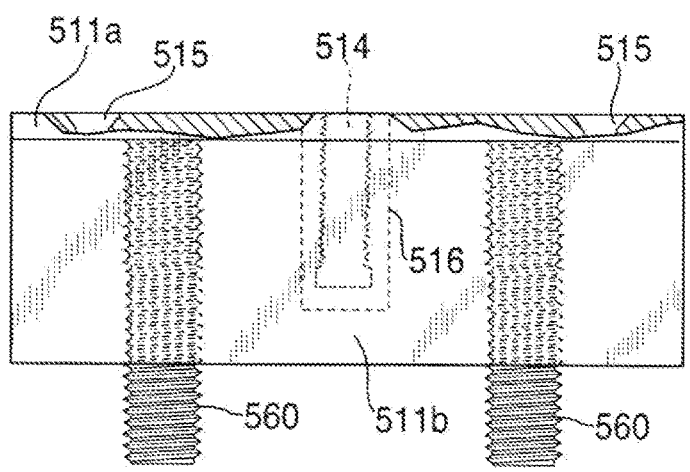

FIGS. 17*a*, 17*b*, 17*c* correspond to the views of FIGS. 13*a*, 13*b*, 13*c* in showing a smooth post 516 flanked by a pair of threaded studs 560 on opposite sides, except that it is configured and positioned for an outside corner instead of an inside corner. Here too, the threaded studs 560 are affixed to the underside of sidewall 511*a* and would pass through holes in the support structure (not shown) to allow the same to be held and locked in place from below the roof structure by a washer 540 and nut 539 mounted on the ends thereof.

Figure 18A:
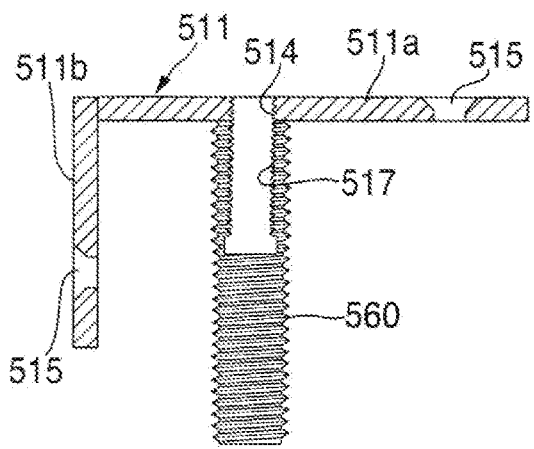
FIG. 18a is a side sectional view of the novel anchor baseplate assembly embodying the present invention shown having two threaded cylindrical posts in the form of studs for mounting on an outside corner of a roof support structure.
Figure 18B:
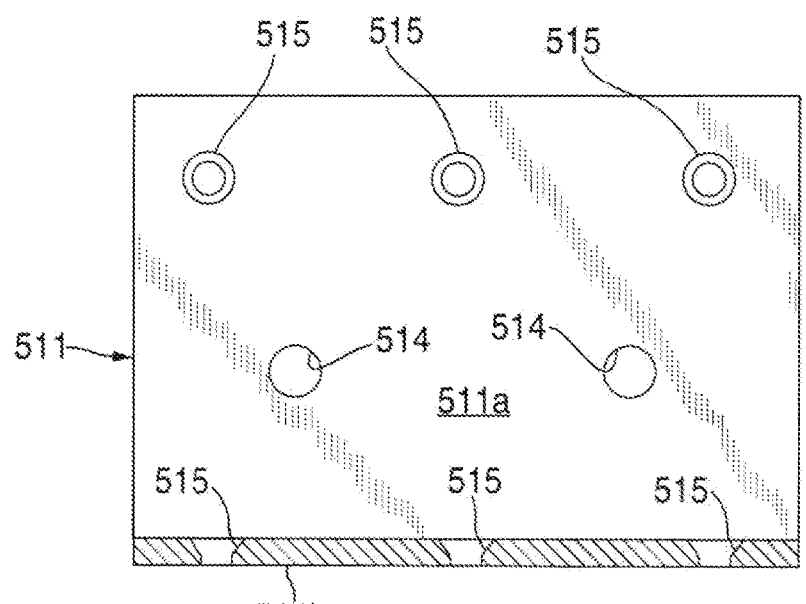
Figure 18C:
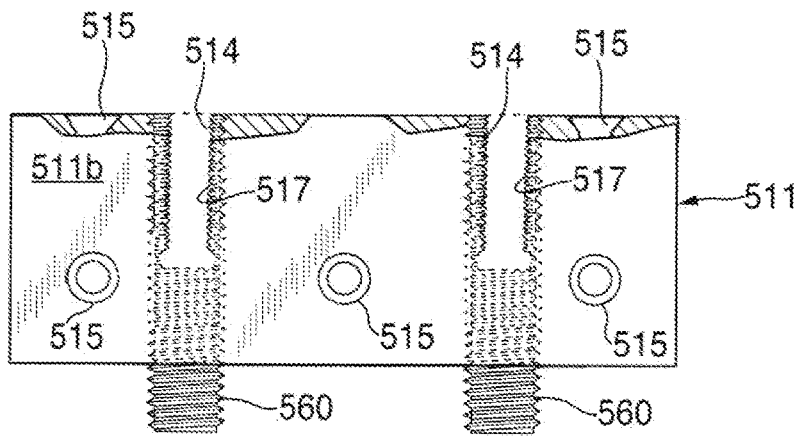

FIGS. 18*a*, 18*b*, 18*c* are comparable to the two-post arrangements shown in FIGS. 16*a*-16*c*, but in this embodiment the two posts are elongated threaded studs 560 disposed in a spaced-apart manner. Each of the studs 560 is provided with a central blind bore 517 having an opening merging with bore 514 in anchor baseplate 511*a*. The fastening studs 560 would typically be welded to the angled baseplate sidewall 511*a* and, as in FIGS. 17*a*, 17*b* and 17*c*, they too would be fastened to the support structure, in this case the roof 501, with the aid of threaded nut 539 and washer 541 fastened thereto from below the roof (not shown) to provide a much stronger joint and anchor.

While the anchor baseplate assemblies of FIGS. 9-18 are typically intended for inside and outside corners for roof structures, they could also be used for various applications in the building or other industries where such rigid and/or waterproof anchors are needed.

As briefly touched upon in the discussion of FIG. 4*a*, it is important to use cylindrical mechanical fasteners having a "straight" thread for mounting an object on a support structure via the internally-threaded cylindrical blind bore of the various embodiments described herein. More specifically, mechanical fasteners of this type have a so-called "straight" thread—namely bolts with heads and cylindrical threaded shafts and cylindrical rod-shaped studs which are headless. This is to be distinguished from a "cone-shaped" screw which has a so-called "tapered" thread. The use of such a cylindrical bolt or stud fastener with a straight thread ensures a strong joint and the versatility of accommodating fasteners of varying lengths and widths for achieving various degrees of holding power via threaded receipt in the internally-threaded, cylindrical blind bores of the posts which also have a straight edge. In contrast, the mechanical fasteners used to affix the anchor baseplate to a support via ancillary holes 15 may generally be of any type including screws with a "tapered" thread.

While the foregoing specifically describes and illustrates the use of the anchor baseplate assemblies shown in use with glass rails, and lightning rods, they can also be used for anchoring and supporting a wide variety of other objects to support structures, such as roofs for other building accessories, e.g., antennas, TV satellite dishes, HVAC units and the like. For example, they could be used for securing an L-shaped support bracket for supporting such roof accessories.

It should also be noted that the anchor platform assemblies can also be used for building and other applications where waterproofing isn't necessary, such as exterior or interior building walls, ceilings, floors, steps, outdoor decks, etc. where simply a rigid and strong anchor support is important.

As can also be appreciated from the foregoing, the shape and the number of anchor baseplates, the shape, type and number of posts, whether externally-threaded or smooth, the use of non-threaded throughbores, threaded blind bores, and the placement thereof can also be modified depending upon the specific details of the particular application such as the nature, size and material of the roof or other building support structures, such as metal, wood or some other composite. Similarly, it is anticipated that the types of fasteners, membranes flashing materials and sealants will also be chosen to be compatible with the roof or building structure. Also, the components of the various embodiments may be substituted for one another where appropriate.

In addition, the dimensions and size of the assembly components can vary dependent on the particular application. For example, the cylindrical posts typically have diameters and are preferably in a range of ⅛" to 2" and can range up to 18" in length. The thickness of the baseplate may be varied according to need, for example, preferably between 1/16" to 1", but preferably ¼", In a preferred embodiment, the posts have an external diameter of ½" and its internal bore has a diameter of ⅜".

The materials of the components of the anchor assemblies, such as the baseplates, posts, and studs can also be made of a variety of materials, including, e.g., metals such as stainless steel, aluminum, bronze, and copper, but also plastic or composite materials. It is also preferred that the baseplate and its post and optional studs are integrally formed or joined to form a one-piece component. In particular, it can be appreciated that the posts and/or studs can be secured to the baseplate via welding or other means.

The two respective sides 511*a* and 511*b* of the baseplate 511" may be formed as one piece, for example, by bending a metal plate of the proper size and thickness or may formed by attaching the separate sides 511*a*, 511*b* together. For example, the two sides 511*a*, 511*b* can be attached to each other by welding one of their respective ends together.

Accordingly, while particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. An anchor platform assembly for anchoring an object of the type having a planar wall with an opening therethrough to a support structure of the type having a planar wall with an opening thereinto with the aid of a mechanical fastener, said anchor platform assembly comprising:
   a one-piece anchor comprising an anchor baseplate having a planar top surface and a planar bottom surface with an opening therethrough extending from said top surface to said bottom surface thereof, and an elongated, cylindrical post having a top end portion secured to said anchor baseplate and a bottom end portion projecting below said bottom surface of said anchor baseplate, said post having a non-externally-threaded outer surface and a closed bottom end, and an at least partially internally-threaded cylindrical blind bore extending from said opening in said top surface of said anchor baseplate into said post;
   said anchor baseplate including a first sidewall and a second sidewall disposed at an angle to each other, each of said sidewalls having a first surface and second surface on opposite sides thereof and a pair of opposite ends and wherein one of said ends of said first and second sidewalls are joined together; and
   said elongated post being coupled to said anchor baseplate first sidewall and projecting outwardly from said second surface thereof, said post having a first end secured to said first sidewall of said anchor baseplate and a second free end, and said at least partially internally-threaded, cylindrical internal blind bore extending from said first surface of said anchor baseplate first sidewall into said post, with said second surface of said first sidewall of said anchor baseplate being configured to allow the structure to lie generally flush against said second surface of said first sidewall, except for the area of said second surface covered by said post;
   means for fastening the object to said one-piece anchor, said means for fastening comprising said at least partially internally-threaded bore of said post to thereby permit the planar wall of the object and said planar top wall of said anchor baseplate to be positionable relative to one another for permitting the planar wall of the object and said planar top wall of said anchor baseplate to lie adjacent and parallel with one another with their respective openings aligned with one another and said blind bore of said post;
   means for fastening said anchor baseplate to the support structure to thereby permit said planar wall of said bottom surface of said anchor baseplate and the planar wall of the support structure to be positionable relative to one another so as to permit them to lie adjacent and parallel with one another with their respective openings aligned with one another and said blind bore of said post, whereby said bottom portion of said post will extend into the opening of the support structure and can be fixed in place with the aid of the mechanical fastener; and
   wherein said means for fastening said anchor baseplate to the support structure comprises a plurality of spaced-apart, ancillary through holes formed in said anchor baseplate extending from the top surface of said anchor baseplate to said bottom surface thereof.

2. The anchor platform assembly according to claim 1, wherein said means for fastening the object comprises a cylindrical mechanical fastener.

3. The anchor platform assembly according to claim 1, wherein said anchor baseplate is generally L-shaped with said first sidewall disposed generally perpendicularly relative to said second sidewall thereof.

4. The anchor platform assembly according to claim 1, wherein said blind bore is generally centrally-disposed in said first sidewall of said anchor baseplate, and wherein said anchor baseplate first sidewall has a plurality of spaced-apart, ancillary through holes spaced from said blind bore.

5. The anchor platform assembly according to claim 4, further comprising a plurality of mechanical fasteners, each receivable through one of said ancillary holes for fastening said anchor baseplate to the structure.

6. The anchor platform assembly according to claim 2, wherein said cylindrical mechanical fastener comprises a bolt with an enlarged head and a threaded cylindrical shaft having a straight thread.

7. The anchor platform assembly according to claim 1, wherein said post has a smooth outer surface.

8. The anchor platform assembly according to claim 1, wherein first and second sidewalls of said anchor baseplate are generally rectangular.

9. The anchor platform assembly according to claim 1, wherein said first sidewall of said anchor baseplate has a non-threaded throughbore which partially defines said blind bore and which merges with said blind bore extending into said post and wherein said post is cylindrical and has a reduced diameter neck portion adjacent its first end which is configured and dimensioned for receipt within said non-threaded throughbore.

10. The anchor platform assembly according to claim 6, further comprising an object support member having a basewall and a bore formed therethrough which is positionable on said anchor baseplate so that said basewall bore is aligned with said threaded blind bore to permit said threaded cylindrical shaft of said bolt to be inserted through said basewall bore and into said threaded blind bore so as to fasten said object support member to said anchor baseplate.

11. The anchor platform assembly according to claim 6, further comprising an elongated and U-shaped object support member for an object which has a generally planar basewall and a pair of upstanding spaced-apart sidewalls each joined to an opposite end of said basewall thereof which, together with said basewall, defines a generally U-shaped channel with an open end in which an object may be inserted.

12. The anchor platform assembly according to claim 4, wherein said object support member further comprises:
   a pair of sidewalls each joined to an opposite end of said basewall thereof and each having a throughbore extending therethrough;
   a support stand comprising a planar base and an upstanding tubular body member joined to said planar base, said planar base having a throughbore formed therethrough alignable with said threaded blind bore of said anchor baseplate to permit said threaded bolt to be inserted through said base through bore into said threaded blind bore so as to fasten said planar base of said support stand to said anchor baseplate, and said tubular body member having opposing sidewalls, each having a throughbore aligned with the throughbore in the opposing sidewall; and
   means for mechanically fastening said object support member to said support stand via at least one of said sidewall throughbores of said support stand and at least one of said sidewall throughbores of said object support member; and wherein said support stand is mechanically fastened to said anchor baseplate via said throughbore of said base wall thereof and said threaded blind bore of said anchor baseplate via said bolt.

13. The assembly according to claim 1, wherein said anchor baseplate first sidewall and second sidewall are arranged and secured together to form a generally V-shaped profile to permit the same to be mounted on a pitched structure.

14. The anchor platform assembly according to claim 1, wherein said anchor baseplate assembly comprises a plurality of said posts and said blind bores.

15. The anchor platform assembly according to claim 14, wherein two of said posts and two of said blind bores are provided.

16. The anchor platform assembly according to claim 1, wherein said elongated post comprises at least one threaded stud secured to said second surface of said first sidewall thereof of said anchor baseplate.

17. The anchor platform assembly according to claim 16, wherein said anchor platform assembly comprises a plurality of said studs and said blind bores.

18. The anchor platform assembly according to claim 1, wherein said means for fastening said anchor baseplate to a support structure includes two threaded studs arranged in a spaced apart manner on opposite sides of said post on said first sidewall of said anchor baseplate, each having one end affixed to the second surface of said first sidewall and an opposite free end projecting outwardly therefrom.

19. The anchor platform assembly according to claim 1, wherein said anchor baseplate and post are made from metal.

* * * * *